(12) United States Patent
Dorner et al.

(10) Patent No.: US 10,235,389 B2
(45) Date of Patent: Mar. 19, 2019

(54) IDENTIFYING DATA FROM KEYWORD SEARCHES OF COLOR PALETTES

(71) Applicant: Amazon Technologies, Inc., Reno, NV (US)

(72) Inventors: Charles Shearer Dorner, Seattle, WA (US); Jenny Ann Blackburn, Seattle, WA (US); Eva Manolis, Bellevue, WA (US); Timothy Andrew Ong, Sammamish, WA (US); Paul Barnhart Sayre, III, Gig Harbor, WA (US)

(73) Assignee: Amazon Technologies, Inc., Seattle, WA (US)

( * ) Notice: Subject to any disclaimer, the term of this patent is extended or adjusted under 35 U.S.C. 154(b) by 692 days.

(21) Appl. No.: 14/316,153

(22) Filed: Jun. 26, 2014

(65) Prior Publication Data
US 2015/0379005 A1  Dec. 31, 2015

(51) Int. Cl.
*G06F 17/30* (2006.01)
(52) U.S. Cl.
CPC .. *G06F 17/30265* (2013.01); *G06F 17/30274* (2013.01)
(58) Field of Classification Search
CPC ......... G06F 17/30241; G06F 17/30554; G06F 17/30864; G06F 17/30867; G06F 17/3097; G06F 11/26; G06F 11/2705; G06F 11/276; G06F 11/277; G06F 11/30256; G06F 11/30265; G06F 11/30321; G06F 11/3043; G06F 11/30477; G06F 11/3087; G06F 11/30991; G06F 19/322; G06F 19/3406;
(Continued)

(56) References Cited

U.S. PATENT DOCUMENTS 5,508,718 A  4/1996  Haikin
5,544,284 A  8/1996  Allebach et al.
(Continued)

FOREIGN PATENT DOCUMENTS

CN  107077474 A  8/2017
CN  107077698 A  8/2017
(Continued)

OTHER PUBLICATIONS

Balasubramanian, Raja, et al.; Sequential Scalar Quantization of Color Images, Journal of Electronic Imaging, vol. 3, No. 1, pp. 45-59; Jan. 1994.
(Continued)

*Primary Examiner* — Amanda L Willis
(74) *Attorney, Agent, or Firm* — Knobbe, Martens, Olson & Bear, LLP

(57) ABSTRACT

Systems and methods are described herein to determine data associated with color palettes identified from keyword searches. Color palettes may include colors determined by human color preferences. Color palettes may be searched by name or other data associated with the color palettes. Individual colors may be extracted from color palettes, which may be used to fast index color search a data store of images and/or items. The items and/or images associated with color palettes may be returned based at least in part on the keyword search. Various user interfaces may be based at least in part on the keyword searching and/or trending techniques for color palettes.

20 Claims, 16 Drawing Sheets

(58) Field of Classification Search
CPC .......... G06F 1/163; G06F 21/32; G06F 21/34; G06F 3/0482; G06F 3/04842; G06F 3/0604; G06F 3/0653; G06F 3/0673
See application file for complete search history.

(56) References Cited

U.S. PATENT DOCUMENTS

| | | |
|---|---|---|
| 5,684,895 A | 11/1997 | Harrington |
| 5,822,503 A | 10/1998 | Gass, Jr. et al. |
| 6,014,125 A | 1/2000 | Herbert |
| 6,041,311 A | 3/2000 | Chislenko et al. |
| 6,081,276 A | 6/2000 | Delp |
| 6,124,945 A | 9/2000 | Ishihara et al. |
| 6,385,336 B1 | 5/2002 | Jin |
| 6,513,014 B1 | 1/2003 | Walker et al. |
| 6,577,759 B1 | 6/2003 | Caron et al. |
| 7,136,074 B2 | 11/2006 | Hussie |
| 7,444,658 B1 | 10/2008 | Matz et al. |
| 7,801,893 B2 | 9/2010 | Gulli' et al. |
| 7,961,938 B1* | 6/2011 | Remedios ........... G06F 17/3025 382/100 |
| 8,393,002 B1 | 3/2013 | Kamvar et al. |
| 8,416,255 B1 | 4/2013 | Gilra |
| 8,553,045 B2 | 10/2013 | Skaff et al. |
| 8,576,241 B1 | 11/2013 | Kanter et al. |
| 8,587,604 B1 | 11/2013 | Kanter et al. |
| 8,593,680 B2 | 11/2013 | Woolfe et al. |
| 8,634,640 B2 | 1/2014 | Bhatti et al. |
| 8,762,419 B2 | 6/2014 | Moroney |
| 8,867,798 B2 | 10/2014 | Shuster |
| 9,047,804 B1 | 6/2015 | Moroney et al. |
| 9,135,719 B1 | 9/2015 | Dorner et al. |
| 9,177,391 B1 | 11/2015 | Dorner et al. |
| 9,245,350 B1 | 1/2016 | Dorner et al. |
| 9,311,889 B1 | 4/2016 | Dorner et al. |
| 9,396,560 B2 | 7/2016 | Dorner et al. |
| 9,401,032 B1 | 7/2016 | Dorner et al. |
| 9,514,543 B2 | 12/2016 | Dorner et al. |
| 9,524,563 B2 | 12/2016 | Sayre et al. |
| 9,542,704 B2 | 1/2017 | Dorner et al. |
| 9,552,656 B2 | 1/2017 | Dorner et al. |
| 9,633,448 B1 | 4/2017 | Dorner |
| 9,652,118 B2 | 5/2017 | Hill et al. |
| 9,652,868 B2 | 5/2017 | Gunningham et al. |
| 9,659,032 B1 | 5/2017 | Dorner et al. |
| 9,679,532 B2 | 6/2017 | Dorner et al. |
| 9,697,573 B1 | 7/2017 | Haitani et al. |
| 9,727,983 B2 | 8/2017 | Dorner et al. |
| 9,741,137 B2 | 8/2017 | Dorner et al. |
| 9,785,649 B1 | 10/2017 | Dorner et al. |
| 9,792,303 B2 | 10/2017 | Sayre, III et al. |
| 9,898,487 B2 | 2/2018 | Sayre, III et al. |
| 9,916,613 B1 | 3/2018 | Dorner et al. |
| 9,922,050 B2 | 3/2018 | Dorner et al. |
| 9,996,579 B2 | 6/2018 | Dorner et al. |
| 10,049,466 B2 | 8/2018 | Dorner et al. |
| 2001/0028464 A1 | 10/2001 | Aritomi |
| 2002/0080153 A1 | 6/2002 | Zhao et al. |
| 2003/0004938 A1 | 1/2003 | Lawder |
| 2003/0011612 A1 | 1/2003 | Luo et al. |
| 2003/0083850 A1 | 5/2003 | Schmidt et al. |
| 2003/0142124 A1 | 7/2003 | Takata et al. |
| 2003/0146925 A1 | 8/2003 | Zhao et al. |
| 2004/0090453 A1 | 5/2004 | Jasinschi et al. |
| 2005/0122427 A1 | 6/2005 | Hougui et al. |
| 2005/0149411 A1 | 7/2005 | Colwell |
| 2005/0222978 A1 | 10/2005 | Drory et al. |
| 2006/0023082 A1 | 2/2006 | Higuchi |
| 2006/0066629 A1 | 3/2006 | Norlander et al. |
| 2006/0248081 A1 | 11/2006 | Lamy |
| 2006/0250669 A1 | 11/2006 | Beretta |
| 2006/0268120 A1 | 11/2006 | Funakura et al. |
| 2007/0100786 A1 | 5/2007 | Moroney |
| 2008/0003547 A1 | 1/2008 | Woolfe et al. |
| 2008/0025629 A1 | 1/2008 | Obrador et al. |
| 2008/0025647 A1 | 1/2008 | Obrador et al. |
| 2008/0046410 A1* | 2/2008 | Lieb .................... G06F 17/3025 |
| 2008/0046424 A1 | 2/2008 | Horton |
| 2008/0069442 A1 | 3/2008 | Itoh |
| 2008/0294600 A1 | 11/2008 | Clark et al. |
| 2008/0301582 A1 | 12/2008 | Gluck |
| 2008/0317336 A1 | 12/2008 | Mojsilovic |
| 2009/0027414 A1 | 1/2009 | Vaughn |
| 2009/0041345 A1 | 2/2009 | Tirumalareddy et al. |
| 2009/0055758 A1 | 2/2009 | Sim et al. |
| 2009/0157595 A1 | 6/2009 | Gubitz |
| 2009/0227375 A1 | 9/2009 | Weisman et al. |
| 2009/0248626 A1* | 10/2009 | Miller ................. G06F 17/3087 |
| 2009/0259567 A1 | 10/2009 | Watts |
| 2009/0276368 A1 | 11/2009 | Martin et al. |
| 2009/0281925 A1 | 11/2009 | Winter et al. |
| 2010/0027834 A1 | 2/2010 | Spitzig et al. |
| 2010/0053201 A1 | 3/2010 | Klassen et al. |
| 2010/0082654 A1 | 4/2010 | Zhang et al. |
| 2010/0110455 A1 | 5/2010 | Woolfe |
| 2010/0158412 A1 | 6/2010 | Wang et al. |
| 2011/0029510 A1 | 2/2011 | Kroon et al. |
| 2011/0135195 A1 | 6/2011 | Marchesotti et al. |
| 2011/0205231 A1 | 8/2011 | Hartley et al. |
| 2011/0305386 A1 | 12/2011 | Wang et al. |
| 2011/0319160 A1 | 12/2011 | Arn et al. |
| 2012/0036163 A1 | 2/2012 | Myers et al. |
| 2012/0045121 A1 | 2/2012 | Youngman et al. |
| 2012/0075329 A1 | 3/2012 | Skaff et al. |
| 2012/0099784 A1 | 4/2012 | Marchesotti et al. |
| 2012/0099788 A1 | 4/2012 | Bhatti et al. |
| 2012/0109944 A1 | 5/2012 | Hao |
| 2012/0154420 A1 | 6/2012 | Calandrino et al. |
| 2012/0163710 A1 | 6/2012 | Skaff et al. |
| 2012/0206477 A1 | 8/2012 | Yanagisawa |
| 2013/0013991 A1 | 1/2013 | Evans |
| 2013/0033603 A1 | 2/2013 | Suzuki et al. |
| 2013/0050238 A1 | 2/2013 | Bergou et al. |
| 2013/0148741 A1 | 6/2013 | Steinberg et al. |
| 2013/0159100 A1 | 6/2013 | Raina et al. |
| 2013/0226659 A1 | 8/2013 | Patel et al. |
| 2013/0227636 A1 | 8/2013 | Bettini et al. |
| 2013/0235398 A1 | 9/2013 | Bhatti et al. |
| 2013/0266217 A1 | 10/2013 | Gershon et al. |
| 2013/0300761 A1 | 11/2013 | Ahmed |
| 2014/0037200 A1 | 2/2014 | Phillips et al. |
| 2014/0037884 A1 | 2/2014 | Wambolt et al. |
| 2014/0044349 A1 | 2/2014 | Wang et al. |
| 2014/0049799 A1 | 2/2014 | Li et al. |
| 2014/0052584 A1 | 2/2014 | Gershon et al. |
| 2014/0067014 A1 | 3/2014 | Kaula et al. |
| 2014/0089781 A1 | 3/2014 | Hoguet |
| 2014/0153821 A1 | 6/2014 | Masuko et al. |
| 2014/0177952 A1 | 6/2014 | Masuko |
| 2014/0189476 A1 | 7/2014 | Berthelot et al. |
| 2014/0270498 A1 | 9/2014 | Chester et al. |
| 2014/0300775 A1 | 10/2014 | Fan et al. |
| 2014/0304661 A1 | 10/2014 | Topakas et al. |
| 2014/0334722 A1 | 11/2014 | Bloore et al. |
| 2014/0355874 A1 | 12/2014 | Sakamaki et al. |
| 2015/0235110 A1 | 8/2015 | Curtis et al. |
| 2015/0235389 A1 | 8/2015 | Miller et al. |
| 2015/0262549 A1 | 9/2015 | Moroney |
| 2015/0269747 A1 | 9/2015 | Hogan et al. |
| 2015/0324392 A1 | 11/2015 | Becker et al. |
| 2015/0324394 A1 | 11/2015 | Becker et al. |
| 2015/0332479 A1 | 11/2015 | Gershon et al. |
| 2015/0356128 A1 | 12/2015 | Nishimura |
| 2015/0378999 A1 | 12/2015 | Dorner et al. |
| 2015/0379000 A1 | 12/2015 | Haitani et al. |
| 2015/0379001 A1 | 12/2015 | Gunningham et al. |
| 2015/0379002 A1 | 12/2015 | Dorner et al. |
| 2015/0379003 A1 | 12/2015 | Dorner et al. |
| 2015/0379004 A1 | 12/2015 | Sayre et al. |
| 2015/0379006 A1 | 12/2015 | Dorner et al. |
| 2015/0379071 A1 | 12/2015 | Dorner et al. |
| 2015/0379608 A1 | 12/2015 | Dorner et al. |
| 2015/0379731 A1 | 12/2015 | Dorner et al. |
| 2015/0379732 A1 | 12/2015 | Sayre et al. |

(56) References Cited

U.S. PATENT DOCUMENTS

| | | |
|---|---|---|
| 2015/0379733 A1 | 12/2015 | Dorner et al. |
| 2015/0379738 A1 | 12/2015 | Gunningham et al. |
| 2015/0379739 A1 | 12/2015 | Dorner et al. |
| 2015/0379743 A1 | 12/2015 | Dorner et al. |
| 2015/0379959 A1 | 12/2015 | Dorner et al. |
| 2016/0005188 A1 | 1/2016 | Dorner et al. |
| 2016/0005201 A1 | 1/2016 | Kunkel et al. |
| 2016/0104303 A1 | 4/2016 | Dorner et al. |
| 2016/0335784 A1 | 11/2016 | Dorner et al. |
| 2017/0084053 A1 | 3/2017 | Dorner et al. |
| 2017/0098314 A1 | 4/2017 | Sayre et al. |
| 2017/0206061 A1 | 7/2017 | Kumar et al. |
| 2017/0270620 A1 | 9/2017 | Haitani et al. |
| 2018/0025002 A1 | 1/2018 | Dorner et al. |
| 2018/0040142 A1 | 2/2018 | Dorner et al. |
| 2018/0158128 A1 | 6/2018 | Dorner et al. |
| 2018/0232414 A1 | 8/2018 | Dorner et al. |

FOREIGN PATENT DOCUMENTS

| | | |
|---|---|---|
| EP | 3 161 677 | 5/2017 |
| EP | 3 161 770 | 5/2017 |
| JP | 2007-286767 A | 11/2007 |
| JP | 2009-181468 A | 8/2009 |
| JP | 2009-251850 A | 10/2009 |
| JP | 2011-154687 A | 8/2011 |
| JP | 2012-221317 A | 11/2012 |
| JP | 6315524 B2 | 4/2018 |
| WO | WO 2014/070914 A1 | 5/2014 |
| WO | WO 2015/145766 A1 | 10/2015 |
| WO | WO 2015/200502 A1 | 12/2015 |
| WO | WO 2015/200505 A1 | 12/2015 |
| WO | WO 2015/200509 A1 | 12/2015 |
| WO | WO 2015/200515 A1 | 12/2015 |
| WO | WO 2015/200523 A1 | 12/2015 |

OTHER PUBLICATIONS

"Color Blind Assistant." iPhone Apps Versions 2.61 and 2.62; Release date Oct. 14-15, 2009; pp. 1-7.

"Color Name & Hue." Wayback Machine Archive; May 16, 2013; pp. 1-17. <http://web.archive.org/web/20130516202647/http://www.color-blindness.com/color-name-hue>.

"HTML Color Picker," Wayback Machine Archive; Feb. 15, 2013; 1 page. <http://web.archive.org/web/20130215181242/http://imagecolorpicker.com/>.

"Tin Eye Labs." Wayback Machine Archive; Sep. 20, 2012; pp. 1-3. <http://web.archive.org/web/20120920051712/http://labs.tineye.com/color/>.

Delon, J., et al., Automatic Color Palette, Proceedings of the International Conference on Image Processing, vol. 2, Sep. 11-14, 2005, pp. 706-709.

Nickerson, D., et al., Central Notations for ISCC-NBS Color Names, Journal of the Optical Society of America, vol. 31; pp. 587-591; Sep. 1941.

"Exalead CloudView Semantics Whitepaper," Doc. No. EN.140.001.0-V1.2; Oct. 2010, pp. 1-30. Retrieved from http:www.3ds.com/fileadmin/PRODUCTS/EXALEAD/Documents/whitepapers/Exalead-CloudView-Semantics-EN.pdf on Aug. 24, 2015.

Bell, E., Color Detection: Technology on Heels With Lyst Engineering, dated Feb. 22, 2014, retrieved Apr. 7, 2014, <http://developers.lyst.com/data/images/2014/02/22/color-detection/>.

Beretta, Giordano B., et al.; "Harmonious colors: from alchemy to science," Color Imaging XVII: Displaying Processing, Hardcopy, and Applications, SPIE vol. 8292, No. 1, pp. 1-7; Bellingham, WA; Jan. 22, 2012.

Csurka, Gabriela, et al.; "Learning moods and emotions from color combinations," Proceedings of the Seventh Indian Conference on Computer Vision, Graphics and Image Processing, pp. 298-305; New York; Dec. 12, 2010.

Das et al., "Indexing flowers by color names using domain knowledge-driven segmentation," Proc. The Fourth IEEE Workshop on Applications of Computer Vision; pp. 94-99; 1998.

Dorner, C.S., Image-Based Color Palette Generation, U.S. Appl. No. 14/316,483, filed Jun. 26, 2014.

Dorner, C.S., Automatic Image-Based Recommendations Using a Color Palette, U.S. Appl. No. 14/316,268, filed Jun. 26, 2014.

Global Color Survey, http://www.colorcom.com/global-color-survey, Feb. 1, 2001, accessed Sep. 11, 2015.

Heer, Jeffrey, et al.; "Color naming models for color selection, image editing and palette design," Proceedings of the 2012 ACM Annual Conference on Human Factors in Computing Systems, pp. 1007-1016; New York; May 5, 2012.

Lawder, Jonathan, "The Application of Space-filling Curves to the Storage and Retrieval of Multi-dimensional Data," PhD thesis; Sections 4.3.5.1, p. 68, and 6.5, pp. 121-130; Jan. 1, 2000.

Luo, J., et al., "Novel Color Palettization Scheme for Preserving Important Colors," Proceedings SPIE 5008. Color Imaging VIII: Processing, Hardcopy, and Applications; Jan. 20, 2003.

Montagne, C., et al., "Adaptive Color Quantization Using the Baker's Transformation," J. Electronic Imaging 15(2), Apr.-Jun. 2006, 21 pages.

Periasamy, P.S., et al., "A Common Palette Creation Algorithm for Multiple Images with Transparency Information," Proceedings of the International Conference on Advances in Computing, Control, and Telecommunication Techologies, IEEE 2009.

Tremeau et al., "A vector quantization algorithm based on the nearest neighbor of the furthest color," Proceedings of International Conference on Image Processing, vol. 3, pp. 682-685, Oct. 26-29, 1997.

Tropf, H. et al., "Multidimensional range search in dynamically balanced trees," Angewandte Informatik (Applied Informatics), pp. 71-77; Braunschweig, Germany; Feb. 1, 1981.

Wang et al., "Contextual Dominant Color Name Extraction for Web Image Search," 2012 IEEE International Conference on Multimedia and Expo Workshops (ICMEW), pp. 319-324.

Yu, M.P., et al., "Contextual Algorithm for Color Quantization," J. Electronic Imaging 12(3):442-447, Jul. 2003.

Zhu, Haiping, et al., "Deep into Color Names: Matching Color Descriptions by Their Fuzzy Semantics," Artificial Intelligence: Methodology, Systems, and Applications Lecture Notes in Computer Science; Lecture Notes in Artificial Intelligence, pp. 138-149; Jan. 1, 2006.

International Search Report and Written Opinion in PCT/US2015/037469 dated Oct. 1, 2015.

International Search Report and Written Opinion in PCT/US2015/037456 dated Sep. 9, 2015.

International Search Report and Written Opinion in PCT/US2015/037494 dated Sep. 14, 2015.

International Search Report and Written Opinion in PCT/US2015/037465 dated Oct. 27, 2015.

International Search Report and Written Opinion in PCT/US2015/037481 dated Sep. 14, 2015.

Das et al, Indexing Flower Patent Images Using Domain Knowledge, IEEE Intelligent Systems, vol. 14, No. 5; 1999, pp. 24-33.

Manjunath, B.S.;Color and Texture Descriptors; 2001; IEEE; vol. 11 No. 6; pp. 703-715.

Office Action in European Application No. 15734006.8, dated Dec. 21, 2017.

Wang, Yi-Fan, et al., A personalized recommender system for the cosmetic business, Expert Systems with Applications 26 (2004); pp. 427-434.

\* cited by examiner

TIME 1: "SPRINGTIME" ~ 910

| PALETTE 1: "SPRING" | COLOR 1 | COLOR 7 | COLOR 3 | COLOR 4 | COLOR 9 | ~902A |
| --- | --- | --- | --- | --- | --- | --- |
| PALETTE 2: "SPRINGTIME YELLOW" | COLOR 1 | COLOR 5 | COLOR 6 | COLOR 3 | COLOR 10 | ~902B |
| PALETTE 3: "BLOSSOM" | COLOR 2 | COLOR 1 | COLOR 11 | COLOR 19 | COLOR 7 | ~902C |
| PALETTE 4: "SPRINGTIME WALK" | COLOR 17 | COLOR 2 | COLOR 9 | COLOR 1 | COLOR 5 | ~902D |

TIME 2: "SPRINGTIME" ~ 910

| PALETTE 1: "SPRING" | COLOR 1 | COLOR 2 | COLOR 3 | COLOR 4 | COLOR 9 | ~904A |
| --- | --- | --- | --- | --- | --- | --- |
| PALETTE 5: "SPRINGTIME GREEN" | COLOR 13 | COLOR 14 | COLOR 16 | COLOR 3 | COLOR 10 | ~904B |
| PALETTE 6: "BRIGHT SPRING" | COLOR 13 | COLOR 18 | COLOR 20 | COLOR 19 | COLOR 3 | ~904C |
| PALETTE 7: "SPRINGTIME FOREST" | COLOR 13 | COLOR 12 | COLOR 9 | COLOR 14 | COLOR 7 | ~904D |

IDENTIFYING DATA FROM KEYWORD SEARCHES OF COLOR PALETTES

BACKGROUND

Generally described, computing devices may search for information based on a keyword and provide results related to colors. A color or color palettes may be associated with clothes, artwork, images, video, and other visual media to provide a certain or desired look and feel. In electronic commerce, items are associated with various colors or color palettes. In one system, an image or record may be tagged with a color description in a data store. A user may input a keyword (e.g., "green") and any images or records matching the keyword "green" may be returned in a search. In another system, user generated color palettes may be stored by name. A user may input a keyword (e.g., "pastel") and color palettes with names exactly matching the keyword "pastel" may be returned in a search.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

FIG. 9 illustrates example color palettes associated with historical keyword data.

DETAILED DESCRIPTION

Figure 1:
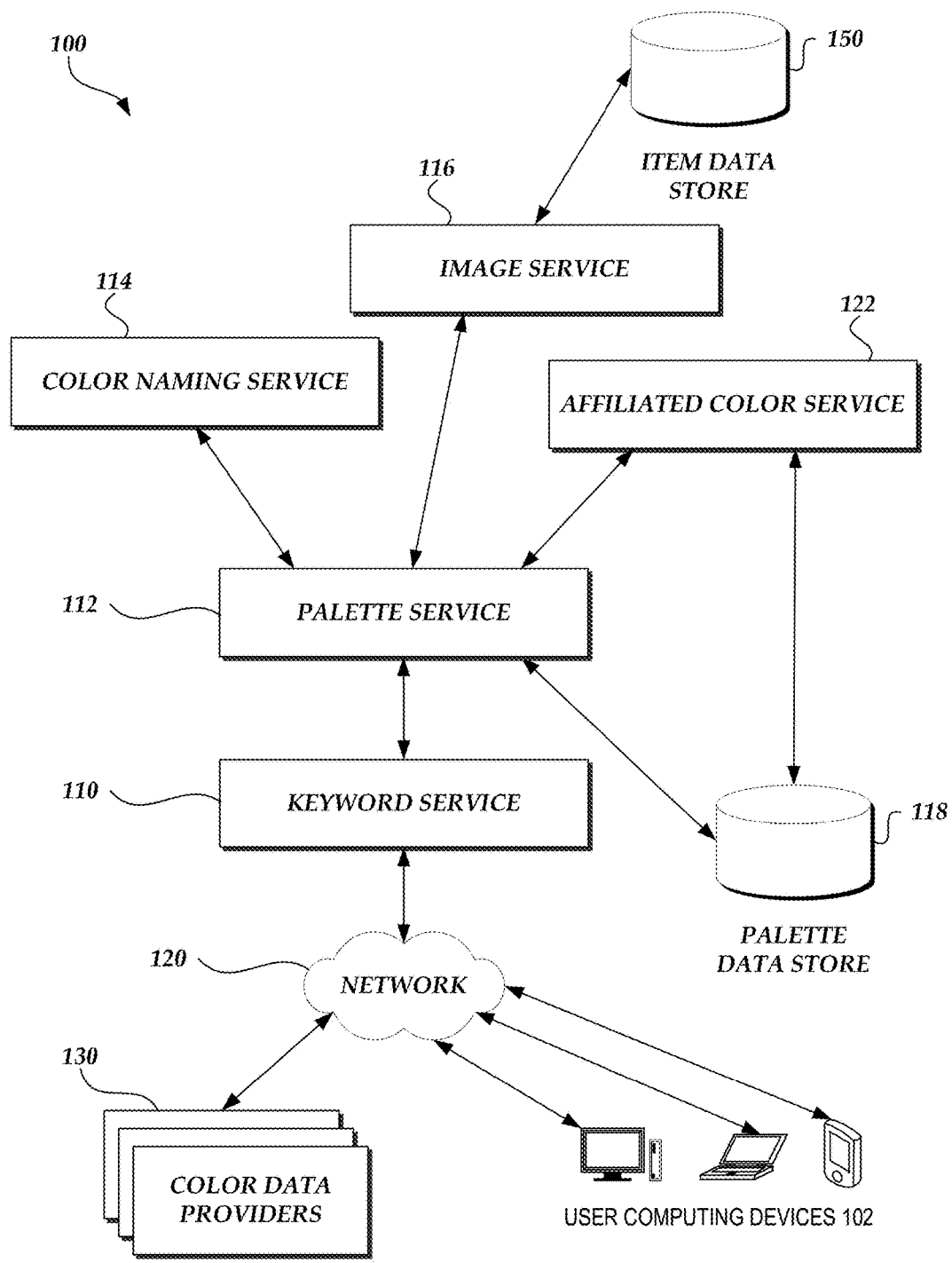
FIG. 1 illustrates a block diagram of an example operating environment for determining data based on keyword searches of one or more color palettes.

Generally described, aspects of the present disclosure relate to identifying images or items (e.g., goods and/or services) based on a keyword search of color palettes that have been ranked or voted on by people. The present disclosure includes systems and methods configured to identify data associated with a keyword search of color palettes. The keyword may be a non-color term suggestive of one or more colors. In one example, a merchandiser searches for a term and/or phrase such as "rainy day." Color palettes associated with the search term may be retrieved based on human generated names of the color palettes. Each color palette may include one or more colors. A fast color search may be performed on each color to retrieve one or more items and/or images sufficiently including that color. In the merchandiser example, the items, which are associated with colors from the retrieved human generated color palettes, may be returned to the merchandiser.

Palettes of colors can be used to design visual articles, such as artwork or clothes, so that the article is visually appealing. This can increase the desirability of the article. In addition, palettes of colors can be used to evoke targeted reactions or emotions that are associated with a look and feel of a visual presentation or article. For example, the colors of clothes can be selected to reflect trends in colors or to reflect a more classic or timeless look.

Systems may be designed to automatically generate color combinations. These systems may use algorithms to determine complementary colors, similar colors, colors arranged in a color space to cover predetermined color distances, and the like to generate a palette of colors. However, mathematical and/or computer algorithms may not account for trends in taste and human color preferences. Individuals can also create color palettes. The resulting color palettes may be different than the formulaic or predictable palettes, which are generated automatically, yet visually appealing at least to the individual that created it. These color palettes may be ones that would generally not be created by a mathematical and/or computer algorithm (e.g., a color palette that includes seemingly clashing colors). Furthermore, humans may associate other metadata with the color palettes, such as, names and/or tags, which may otherwise be difficult for a computer system to do automatically and/or programmatically. These color palettes may then be searched (by name and/or metadata) and associated with items for display to a user. Thus, reliance on human generated color palettes may yield color palettes more visually interesting to users and/or with a wider variety of colors than palettes that are automatically generated by systems that do not rely on human color preferences.

Aspects of the present disclosure use one or more data stores of color palettes, which have been rated, ranked, and/or voted on by a community of people to indicate which color combinations are preferred by that community. As described herein, the color palettes and/or affiliated colors may be searched, determined, and/or retrieved. The color palettes and/or affiliated colors may contain colors, which are visually appealing or preferable because each color and/or color palette has been determined by the community. Affiliated colors will be discussed in further detail below with reference to FIG. 4.

While a retail environment is often used as an example below, it will be appreciated that image, data, and/or color identification from keyword and/or text searching of color palettes, as disclosed herein, may be used in a variety of environments other than a retail environment. For example, aspects of the present disclosure, in some embodiments, may be used and/or implemented to efficiently identify or surface images and/or colors related to color palettes within any user interface, page, video, electronic book and/or other electronic content. In addition, aspects of the present disclosure, in some embodiments, may be used by consumers, merchandisers, designers, architects, artists, landscapers, developers, garners, students, etc. for virtually any purpose. Without limitation, aspects of the present disclosure may be used for identifying images and/or colors related to color palettes in social networking contexts, digital photo albums, digital news articles, and/or visual bookmarking contexts. For illustrative purposes, item images are often described below in the context of items listed in an electronic catalog. Alternatively, in other embodiments, item images that may be presented according to the systems and methods described herein may include advertisements, images in news articles, editorial content, videos, classified listings, auction listings and/or any other content that may be electronically presented to a user. As used herein, the term "item," in addition to having its ordinary meaning, is used interchangeably to refer to an item itself (e.g., a particular product and/or object) and to its description or representation in a computer system or electronic catalog. As will be apparent from the context in which it is used, the term is also sometimes used herein to refer only to the item itself or only to its representation in the computer system.

Turning now to FIG. 1, the figure illustrates a block diagram of an example operating environment 100 that includes a keyword service 110 to determine data based at least in part on a keyword associated with one or more color palettes. In some embodiments, the operating environment 100 includes the keyword service 110, a palette service 112, a color naming service 114, an image service 116, an affiliated color service 122, a palette data store 118, an item data store 150, a network 120, color data providers 130, and user computing devices 102. In some embodiments, various components of the operating environment 100 are communicatively interconnected with one another via the network 120. The operating environment 100 may include different components, additional components, fewer components, or can be structured differently. For example, there can be one or more data stores or other computing devices in connection with the keyword service 110. As another example, components of the operating environment 100 may communicate with one another with or without the network 120. Those skilled in the art will recognize that the user computing devices 102 may be any of a number of computing devices that are capable of communicating over a network including, but not limited to, a laptop, personal computer, personal digital assistant (PDA), hybrid PDA/mobile phone, mobile phone, smartphone, electronic book reader, wearable computing device, digital media player, tablet computer, gaming console or controller, kiosk, augmented reality device, other wireless device, set-top or other television box, and the like.

The keyword service 110 can correspond to any system capable of performing the processes described herein. For example, the processes associated with palette service 112, color naming service 114, image service 116, and/or affiliated color service 122 may be performed by the keyword service and, therefore, separate services may be unnecessary. The keyword service 110 or other services may be implemented by one or more computing devices. For example, the keyword service 110 may be implemented by computing devices that include one or more processors to execute one or more instructions, memory, and communication devices to transmit and receive data over the network 120. In some embodiments, the keyword service 110 is implemented on one or more backend servers capable of communicating over a network. In other embodiments, the keyword service 110 is implemented by one or more virtual machines in a hosted computing environment (e.g., a "cloud computing environment"). The hosted computing environment may include one or more provisioned and released computing resources, which computing resources may include computing, networking or storage devices.

In some aspects, the keyword service 110 can correspond to one or more applications that perform, individually or in combination, the image, data, and/or color identification functions described herein, including determining data from keyword searching of color palettes, determining affiliated color palettes associated with keyword searching of color palettes, retrieving color names associated with color palettes, retrieving color palettes based on historical trend data, or the like and/or some combination thereof. In certain aspects, the keyword service 110, the palette service 112, and/or the affiliated color service 122 may be configured to store or update palettes at the palette data store 118. In some embodiments, the keyword service 110 is associated with a network or network-based merchandise provider, vendor and/or other parties.

In some embodiments, each of the palette data store 118 and/or item data store 150 may be local to the keyword service 110, may be remote from the keyword service 110, and/or may be a network-based service itself. The palette data store 118 and/or item data store 150 may be embodied in hard disk drives, solid state memories, any other type of non-transitory computer-readable storage medium, and/or a file, a database, a relational database, in-memory cache, and/or stored in any such non-transitory computer-readable medium. The palette data store 118 and/or item data store 150 may also be distributed or partitioned across multiple local and/or storage devices without departing from the spirit and scope of the present disclosure. The palette data stored in the palette data store 118 can be collections of colors generated by a user or system based at least in part on human color preferences. Palette data can be of various formats, such as lists, integers, hexadecimal format, vectors, arrays, matrices, etc. Metadata can be associated with individual palettes, for purposes of indicating their format, tags, associations, popularity, date(s)/time(s) of creation/editing, geolocation data, last update time, semantics, features, conditions, associated demographics (e.g., geographical region, age, gender, ethnic group, religion, culture, language, dialect, etc. of users that provided input used in creating the palette), or the like. In some embodiments, the palette data store 118 and/or some other data store may store data associated with color names of individual colors and/or metadata associated with color names. Metadata associated with color names and/or search phrases may be similar to the metadata associated with color palettes (e.g., tags, popularity, time of creation, geolocation data, localization and/or internationalization data, last update time, semantics, features, conditions, and/or associated demographics of their respective creators, etc.).

The image service 116 (or any other service) may be connected to and/or in communication with an item data store 150 that stores images, item information, metadata, and/or attributes regarding a number of items, such as items listed in an electronic catalog as available for browse and/or purchase. Item data stored in item data store 150 may include any information related to each item. For example, item data may include, but is not limited to, price, availability, title, item identifier, item images, item description, item attributes, keywords associated with the item, etc. In some embodiments, the item data store 150 may store digital content items (e.g., audiobooks, electronic books, music, movies, multimedia works, etc.). By way of further example, the item metadata may indicate the item type and/or category, such as "dress" and "clothing," or "blender" and "kitchen appliance." A retail server may also be connected to or in communication with a user data store (not illustrated) that stores user data associated with users of the retail server, such as account information, purchase history, browsing history, item reviews and ratings, personal information, user preferences, location information, etc. In some embodiments, data associated with a user data store is stored in the item data store 150. For example, item search results or item recommendations may be filtered and/or ranked based on purchase history data. The image service 116 and/or the keyword service 110 may be connected to and/or in communication with the item data store 150 that may be used to store one or more images associated with each of the number of items that can be displayed to represent the item in search results or the like. Multiple images can be associated with an item, for instance to aid a user in a purchase decision regarding the item.

The network 120 may include any suitable combination of networking hardware and protocols necessary to establish communications within the operating environment 100. For example, the network 120 may include private networks such as local area networks (LANs) or wide area networks (WANs) as well as public or private wireless networks, satellite networks, cable networks, cellular networks, or the Internet. In such embodiments, the network 120 may include hardware (e.g., modems, routers, switches, load balancers, proxy servers, etc.) and/or software (e.g., protocol stacks, accounting software, firewall/security software, etc.) that establish networking links within the operating environment 100. Additionally, the network 120 may implement one of various communication protocols for transmitting data between components of the operating environment 100.

The color data providers 130 may correspond to hosts of databases and/or data stores of color palettes, color names, color surveys, or the like. The color palettes being ranked, rated, and/or voted on by a community of people associated with the color data providers 130. The various hosts can include, for example and without limitation, hosts of an artistic network site, electronic commerce site, merchandise providers or vendors, survey of the general population, designers, photographers, artists, social network sites, or the like. In some embodiments, the various color data providers 130 are associated with a particular community of people such as artists, designers, photographers, cinematographers, fashion experts, critics, or the like. In certain embodiments, the color data providers 130 are accessible by the public in general such that the associated color palettes are ranked, rated, or voted on by people that do not necessarily belong to any particular community or group.

The color data providers 130 can create and/or curate color combinations based on the preferences of each provider's community of users. Particular color data providers 130 may be associated with a particular community, which includes a biased population. This may allow for the keyword service 110 to retrieve palettes with a known and/or desired bias depending at least in part on the use of the retrieved palettes. This may also allow for the keyword service 110 to reduce or remove the bias present in different communities by combining palettes from a plurality of communities of users.

The color data providers 130 can be associated with any computing device(s) that can facilitate communication with the image processing service 102 via the network 120. Such computing devices can generally include wireless mobile devices (e.g., smart phones, PDAs, tablets, wearable computing devices, or the like), desktops, laptops, game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

One skilled in the relevant art will appreciate that the components and configurations provided in FIG. 1 are illustrative in nature. Accordingly, additional or alternative components and/or configurations, especially regarding the additional components, systems and subsystems for facilitating functions disclosed herein may be utilized.

Figure 2:
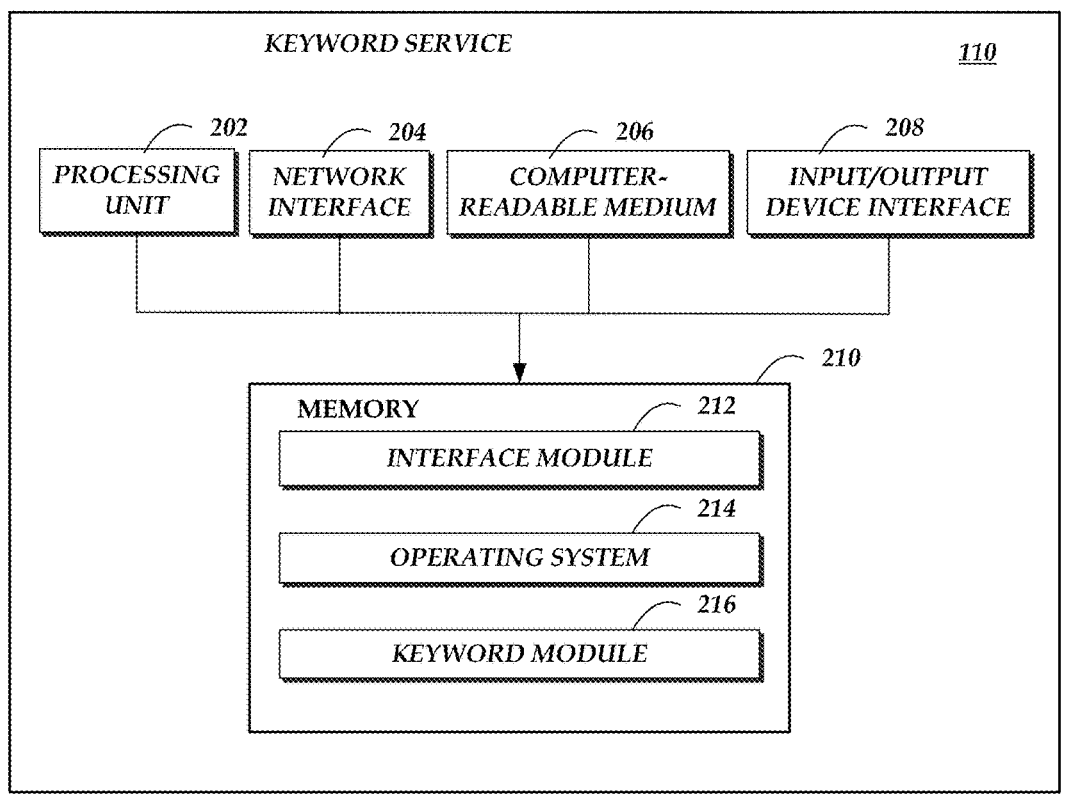
FIG. 2 depicts a general architecture of a computing device providing a keyword service used in accordance with the operating environment of FIG. 1.

FIG. 2 illustrates a block diagram of example components of a computing system capable of implementing a keyword service 110 utilized in accordance with the operating environment 100 of FIG. 1. The example computing system includes an arrangement of computer hardware and/or software components that may be used to implement aspects of the present disclosure. Those skilled in the art will appreciate that the computing system may include different components (e.g., more or fewer components) than those depicted in FIG. 2. Those skilled in the art will also appreciate that not all of these generally conventional components have been shown but are understood to be present to enable the functionality and processes described herein.

The computing system may include a processing unit 202, a network interface 204, a non-transitory computer-readable medium 206, and an input/output device interface 208, all of which may communicate with one another by way of a communication bus. The network interface 204 may provide the keyword service 110 with connectivity to one or more networks or computing systems. The processing unit 202 may thus receive information and instructions from other computing devices, systems, or services via a network. The processing unit 202 may also communicate to and from memory 210 and further provide output information via the input/output device interface 208. The input/output device interface 208 may also accept input from various input devices, such as a keyboard, mouse, digital pen, touch screen, etc.

The memory 210 may contain computer program instructions that the processing unit 202 may execute in order to implement one or more processes described herein. The memory 210 generally includes RAM, ROM, and/or other persistent or non-transitory computer-readable storage media. The memory 210 may store an operating system 214 that provides computer program instructions for use by the processing unit 202 in the general administration and operation of the keyword service 110. The memory 210 may further include other information for implementing aspects of the present disclosure.

In some embodiments, the memory 210 includes an interface module 212. The interface module 212 can be configured to facilitate generating one or more user interfaces through which a user computing device 102, may interact with the keyword service 110 to access related image-data, item data, color palettes, affiliated colors, etc. Specifically, the interface module 212 can be configured to generate user interfaces for receiving keywords, outputting images, data, colors, color names, items, and/or color palettes. The user interface can be implemented as a graphical user interface (GUI), Web-based user interface, computer program, smartphone or tablet program or application, touchscreen, wearable computing device interface, command line interface, gesture, voice, or text interface, etc., or any combination thereof.

In addition, the memory 210 may include a keyword module 216 that may be executed by the processing unit 202. In some embodiments, the keyword module 216 implements aspects of the present disclosure. For example, the keyword module 216 can be configured to process keyword data, color data, instructions, or metadata. Specifically, the keyword module 216 can be configured to perform functions described herein, such as determining data from keyword searching of color palettes, determining affiliated color palettes associated with keyword searching of color palettes, retrieving color names associated with color palettes, retrieving color palettes based on historical trend data, or the like.

It should be noted that the keyword service 110 may be implemented by some or all of the components present in the computing system as discussed herein with respect to FIG. 2. In addition, the keyword service 110 may include additional components not present in FIG. 2. In addition, the computing system described above may also include additional modules or be implemented by computing devices that may not be depicted in FIG. 1 or 2. For example, although the interface module 212 and the keyword module 216 are identified in FIG. 2 as single modules, one skilled in the relevant art will appreciate that the modules may be implemented by two or more modules and in a distributed manner. As another example, the computing system and its components can be implemented by network servers, application servers, database servers, combinations of the same, or the like, configured to facilitate data transmission to and from color data providers 130 or user computing devices 102 via network 120. Accordingly, the depictions of the modules are illustrative in nature. It will also be appreciated that, in some embodiments, a user device may implement functionality that is otherwise described herein as being implemented by the elements and/or modules of the computing system implementing the keyword service 110. For example, the user computing device 102 may receive code modules or other instructions from the computing system implementing the keyword service 110 via the network 120 that are executed by the user computing device 102 to implement various aspects of the present disclosure.

Example Process to Search Color Palettes Using Keywords to Retrieve Data

Figure 3:
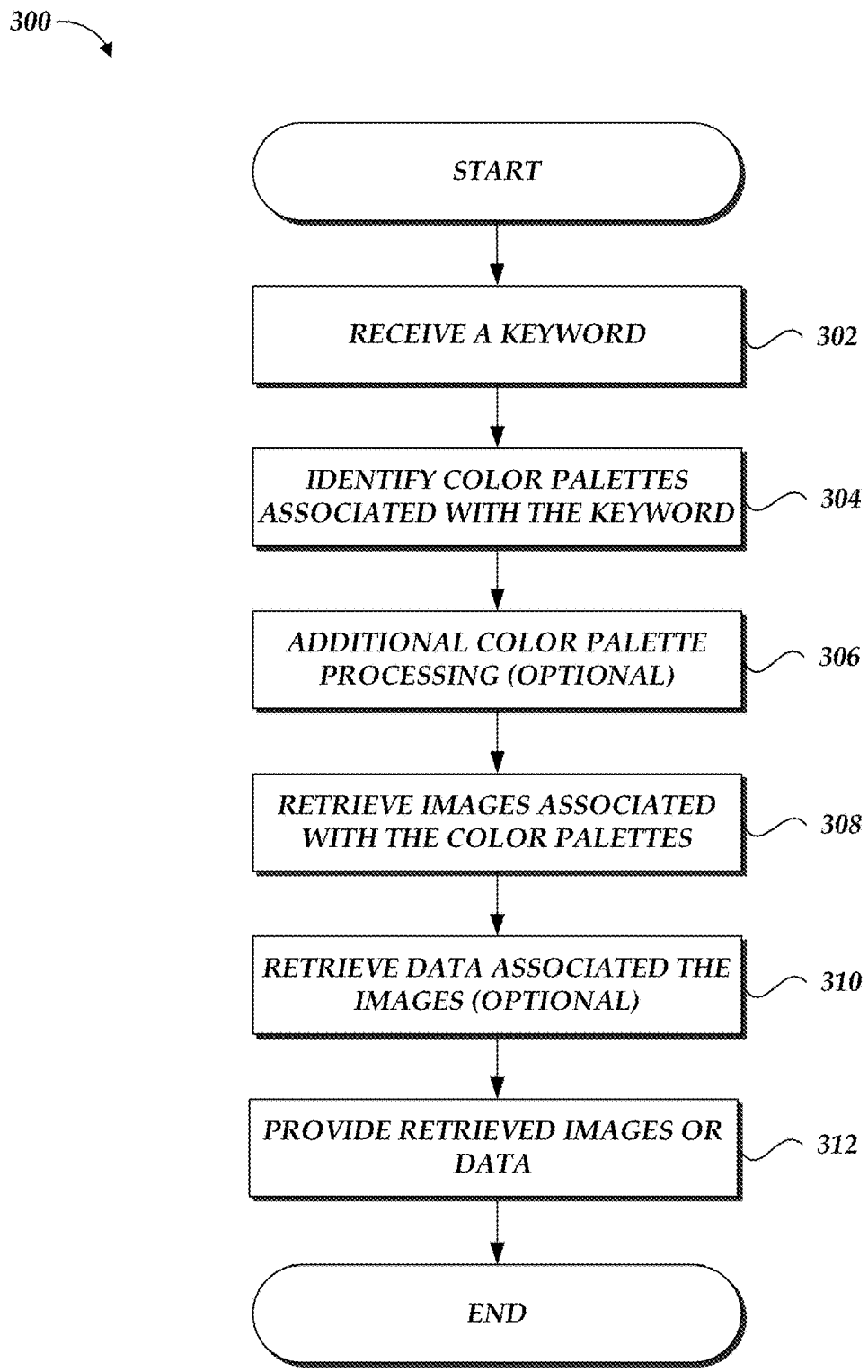
FIG. 3 is a flow diagram of an illustrative method implemented at least in part by a keyword service for determining data based on keyword searches of one or more color palettes.

FIG. 3 is a flow diagram of an illustrative method 300 implemented at least in part by the keyword service 110 identifying image or other data based on a keyword associated with one or more color palettes. While the illustrative method will be described below as being implemented by the components of keyword service 110, in other embodiments, a similar method may be implemented by a computing system responsible for providing front-end communication with a user computing device. As discussed above, illustrative method 300 may be implemented entirely by a user device, such as user computing device 102, in some embodiments.

The illustrative method 300 begins at block 302, where the keyword service 110 may receive a keyword and/or phrase. The received keyword and/or phrase of words may be received via user input or automated input. User input may be received in multiple formats, such as a search string, word, phrase, alphanumeric string, symbol(s), and/or audio input of a word or phrase. A non-color keyword may be received that may be suggestive of one or more colors (e.g., summery, sunny, mellow, dressy, holiday, Halloween, Christmas, Chanukah, sports team name, etc.). Automated input may include textual words associated with audio content, a song, an e-book, and/or data associated with an upcoming holiday and/or season such as fall. Other automated input data may include trending data based on geolocation searches. A particular search phrase may be popular within a particular area and/or region, for example the phrase "Super Bowl" near the time and city of its location, which may be used as input for the illustrative method 300.

At block 304, the keyword service 110 and/or palette service 112 identifies color palettes associated with the received keyword and/or phrase. A color palette may be associated with a name, tags, and/or any other metadata. The characteristics, properties, attributes, and/or other metadata associated with color palettes are discussed in further detail with reference to FIGS. 5 and 8A-B. For example, as described herein, color palettes and/or other metadata associated with color palettes may be generated by humans. The keyword service may identify one or more color palettes from the palette data store based on the keyword using search algorithms including search string algorithms, partial matching of complete strings and/or words, search engine algorithms, natural language searching, state machines such as deterministic finite automatons or nondeterministic finite automatons, fuzzy searching, machine learning, neural networks, or the like and/or some combination thereof. For example, a keyword and/or phrase may include the word "fire." In the example, the keyword service may match color palettes having names such as "fire night," "firestorm," "firestarter," or the like. The keyword search may also match color palettes based on tags, metadata, and/or some other data such as a data store of related words. Thus, a search on the keyword "fire" may return color palettes with names such as "sun," "spicy," "inferno," etc.

At block 306, the keyword service 110 and/or some other service may perform additional color palette processing. Additional color palette processing may include retrieving the color palettes from the palette data store or other additional data retrieval, which is discussed in further detail with reference to FIG. 4.

At block 308, the keyword service 110 and/or the image service 116 retrieves images associated with one or more color palettes. Each color palette may comprise one or more colors, which may be used as input colors for retrieving images. Images may be retrieved from the item data store based at least in part on the one more input colors from the color palettes. It may be difficult and/or computationally expensive to retrieve images, such as clothing or other items, by a specific color (e.g., a specific RGB color or a RGB color range). For example, searching by color in a structured data store can be challenging due to the multidimensional nature of colors. Thus, the keyword service and/or the image service may retrieve images using fast color indexing and/or searching, as described in U.S. patent application Ser. No. 14/315,700, entitled "FAST COLOR SEARCHING," filed on Jun. 26, 2014, which is incorporated by reference herein in its entirety. In some data stores, items may not contain color information and/or items may be manually categorized by color into broad categories of a few colors. Thus, colors can be extracted from an image, such as an image provided by a user or an image of an item in an item catalog or on a network site, as described in U.S. patent application Ser. No. 14/316,483, entitled "IMAGE-BASED COLOR PALETTE GENERATION," filed on Jun. 26, 2014, which is incorporated by reference herein in its entirety. Matching colors from the retrieved color palettes to the colors of images can also include determining a threshold and/or color range within which a color will be considered to be the same as, or sufficiently similar to, the input color. The threshold can be based on color distance according to a color distance formula(e). An example of such a formula is one based on a human perceptible color difference. Examples and/or techniques regarding human perceptible color difference and the human color distance formula are discussed in further detail in U.S. patent application Ser. No. 14/315,700, entitled "FAST COLOR SEARCHING," filed on Jun. 26, 2014, and/or U.S. patent application Ser. No. 14/316,483, entitled "IMAGE-BASED COLOR PALETTE GENERATION," filed on Jun. 26, 2014. In this manner, in some embodiments, images may be retrieved that include colors that are not identical to the input color, but that include colors which are sufficiently close to the input color are included in the search results.

At block 310, the keyword service 110 and/or the image service 116 may optionally retrieve data associated with the retrieved images. As previously discussed, in an electronic commerce context, the item data store 150 may contain item data including, but not limited to, price, availability, title, item identifier, item description, etc., which may be of interest and/or returned to the user. In some embodiments, other data and/or metadata associated with the images may be returned, such as the time of the image (e.g., photograph, video, etc.), location of the image, or other data associated with the image.

At block 312, the keyword service 110 may provide and/or output the retrieved images and/or data. In an electronic commerce example, where a user has searched for "fiery" or based on some other input, the keyword service 110 may have identified one or more color palettes and images associated with those one or more color palettes to be presented to the user computing device or provided to an electronic commerce server. In some embodiments, a benefit of searching human generated color palettes by keywords associated with a name and/or other metadata associated with a color palette is that searching by non-color terms, which are still highly suggestive of color, may yield an accurate and/or wide range of color palettes and/or colors.

The foregoing process may be similarly used by a merchandiser and/or a maintainer of an electronic marketplace in assembling sets of items, such as clothing items, from one or more catalogs of items. For example, the catalog of items may be stored in one or more electronic catalog data stores, such as item data store 150. A merchandiser may search on a phrase such as "baby blue" or "Monday." The merchandiser may optionally specify that items in affiliated colors may be included in the outfit. The example process 300 may then generate one or more recommended outfits and/or items as similarly discussed above with respect to identifying images and/or items associated with color palettes. The merchandiser may select one or more of the presented outfits and cause a record to be stored, for later access, of the outfits including identifiers associated with each item included in a given outfit and a respective same outfit. Multiple outfits may be grouped as a collection. The merchandiser may then instruct that one or more of the outfits, as selected by the merchandiser, or the collection as a whole, be published on a commerce marketplace or elsewhere to enable consumer access and purchase. The merchandiser may also instruct that one or more of the outfits, as selected by the merchandiser, or the collection as a whole, be published as an advertisement on one more sites or other advertising channels. Thus, searching by keywords and/or search phrases to identify and/or determine one or more color palettes and/or colors, may be used to determine color coordinated collections associated with those keywords and/or search phrases.

Example Process for Additional Color Palette Processing

Figure 4:
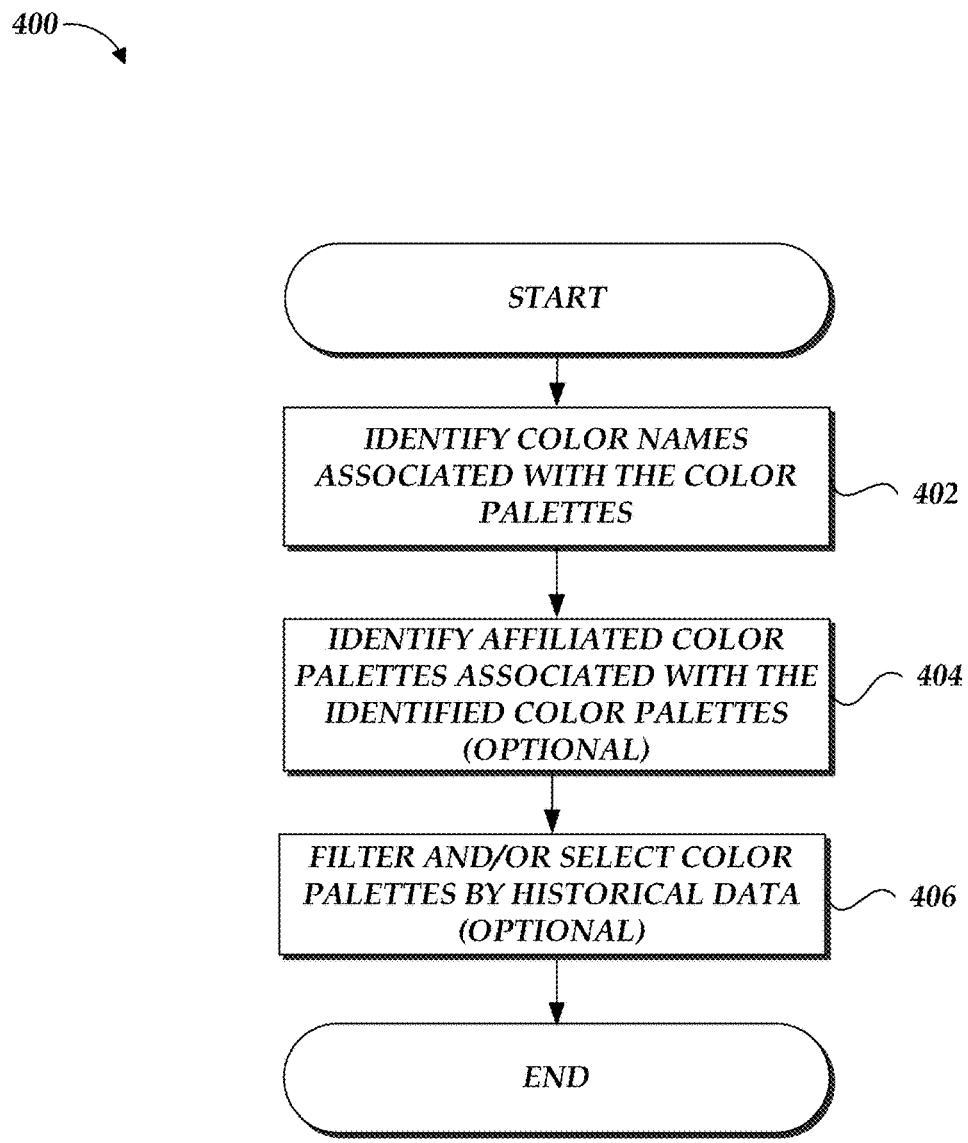
FIG. 4 is a flow diagram of an illustrative method implemented at least in part by a keyword service for additional color palette processing.

FIG. 4 is a flow diagram of an illustrative method 400 implemented at least in part by the keyword service 110 or other services for additional color palette processing. The color palettes that may be additionally processed may have been identified based on an association with the keyword, as described above with reference to block 304 and/or illustrative method 300. While the illustrative method 400 will be described below as being implemented by the components of keyword service 110 or other services, in other embodiments, a similar method may be implemented by a computing system responsible for providing front-end communication with a user computing device. As discussed above, illustrative method 400 may be implemented entirely by a user device, such as user computing device 102, in some embodiments.

The illustrative method 400 begins at block 402, where keyword service 110 and/or the color naming service 114 identify color names associated with the one or more colors of color palettes. As described above, one or more surveys and/or color data providers 130 may provide color data such as a human survey of color names and/or human generated data of color names. For example, one or more color data providers 130 may have surveyed hundreds of thousands of users to name millions of colors. The color names from a human color survey may be richer and/or more accurate than standard color naming data stores and/or data sources. For example, color names based on a color survey may include names that are not typical color names, but that are highly suggestive of color, such as "lime," "asparagus," or the like. The data from such a survey may be stored in the palette data store 118. A color naming service 114 and/or some other service may use fast color searching techniques, as described in application U.S. patent application Ser. No. 14/315,700, entitled "FAST COLOR SEARCHING," filed on Jun. 26, 2014, to retrieve names for one or more colors of color palettes. In some embodiments, color names may be retrieved by the color naming service 114 from the palette data store 118 or some other data store. Additionally or alternatively, similar to the described above techniques for determining images within a color range of an input color, a color name associated with a color may be determined based at least in part on a color range within a color space. Color names may be presented to the user in combination with presented items and/or images. In some embodiments, color names may be used in any other manner such as validating pre-existing color names of items and/or item images, as described in U.S. patent application Ser. No. 14/315,932, entitled "AUTOMATIC COLOR VALIDATION OF IMAGE METADATA," filed on Jun. 26, 2014, which is incorporated by reference herein in its entirety. In some embodiments, historical data regarding color names may be stored and used similar to the trending patterns that are described with reference to FIGS. 8A-B and 9. For example, color name data may be associated with votes and/or time properties to determine trending and/or popular color names.

In some embodiments, color names may be associated with metadata and/or additional data may be determined associated with the color names. For example, a color name of "manatee" may be associated with a description, type, and/or category such as "animal," "sea animal," "mammal," "exotic animal," or the like. In some embodiments, data associated with color names may be determined based at least in part on natural language processing, linguistic techniques, machine learning, artificial intelligence, or other known techniques for dynamically determining additional data associated with words and/or phrases. The color naming service 114 may use the metadata associated with color names to select and/or prioritize color names. For example, color names associated with an animal name (or particular animal names) may be excluded in a clothing context. Additionally and/or alternatively, color naming rules, business rules, and/or logic may be used to select color names. In some embodiments, the rules may be implemented in code (e.g., JAVASCRIPT®, JAVA®, C#, or the like) and/or based on data (e.g., Extensible Markup Language ("XML"), JavaScript Object Notation ("JSON"), records from a data store, or the like). For example, rules may be applied to filter any color name associated with an animal name, bodily function (e.g., "vomit"), or any offensive term and/or phrase. In some embodiments, the color names from a color survey may be associated with ranking and/or voting data indicating human preferences for color names. For example, out of thousands of survey participants, the color name "lime" may receive the highest votes for a particular RGB color and/or value. Thus, the color naming service 114 may return a color name with the highest ranking and/or voting data associated with a particular color. In some embodiments, there may be more than one color name associated with a particular color. In some embodiments, selection of color names may be based on demographic data associated with the color names. For example, one or more color names for men's clothing in a particular color may be different than the one or more color names for women's clothing for the same color because human color surveys may indicate that men and women perceive the same colors differently. Selections of color names may be based on regional and/or cultural differences in the perception(s) of colors. For example, the same color may have two different color names in different regions of the world (e.g., a color may be named "bluish" in Western countries and "greenish" in Eastern countries). In other words, the color names associated with particular colors and/or sets of colors may be localized and/or customized to the regional and/or cultural preferences of color names based on metadata and/or color survey data. In some embodiments, localization and/or internalization of color names may include translating one or more color names into the respective language of a particular user.

At block 404, the keyword service 110 and/or the affiliated color 122 service may optionally identify affiliated color palettes associated with the previously identified color palettes. As used herein, "affiliated color" and/or "affiliated color palettes" refer to colors associated with an initial color or colors based at least in part on human color preferences and/or data store of color palettes. For example, a color palette may include one or more input colors. The one or more input colors of the color palette may be included in other color palettes and, therefore, the other color palettes and/or their colors may be affiliated with the one or more input colors. The affiliated color techniques may be used to generate a color palette based at least in part on an input color or colors and/or identifying related color palettes to an input color or colors. More information regarding generating affiliated colors may be found in U.S. patent application Ser. No. 14/316,292, entitled "BUILDING A PALETTE OF COLORS BASED ON HUMAN COLOR PREFERENCES," filed on Jun. 26, 2014, which is incorporated by reference herein in its entirety.

The affiliated colors and/or color palettes associated with the one or more input colors may be based at least in part on weighting and/or rank data provided by the color data providers 130. For example, one or more color palettes may have been voted on, ranked, and/or rated, as described in further detail with reference to FIGS. 8A-B. In some embodiments, adjusting the weight of the color includes scaling the ranking, rating, and/or number of votes based at least in part on a number of factors, which can include which users voted on the palette, the age of the palette, the number of comments on the palette, and the like. Thus, a preferred, ranked, and/or highest-ranked list of affiliated colors may be generated based on ranking data and/or votes by humans. Generation of affiliated colors may be further based on weighting data. Where a color appears in more than one palette, the weight of that color is the combination of the weights derived from each originating palette. As an example of a simple case, where a color appears in three palettes, the weight of that color can be equal to the sum of the votes of each of the three palettes. It is to be understood that other weight aggregation schemes can be used without departing from the scope of this disclosure. For example, weights can be aggregated using a weighted average of votes, an arithmetic mean of votes, or using some other algorithm (where votes can be the number of votes for a palette, the average rating of a palette, or the ranking of a palette). The weights of each color may be tallied and provided in an ordered or ranked list of affiliated colors, where the rank of an affiliated color is based at least in part on the relative weight of the color. The keyword service 110 can take a subset of the ordered list of affiliated colors based at least in part on a desired, targeted, and/or threshold number of colors to include in the list, a threshold weight factor to include in the list, a variety of colors in the list, or the like.

In some embodiments, affiliated color palettes may be generated. For example, a first color can be selected from a determined and/or searched color palette. The first color may be present in other related color palettes. A list of affiliated colors can be generated by identifying the other colors in the palettes. For each affiliated color in the list, a weight can be assigned based on the ranking, rating, and/or number of votes the containing palette has received. The list of affiliated colors can be sorted based on the assigned weights. The keyword service 110 and/or affiliated color service 122 can select an affiliated color from the sorted list to add to a generated affiliated color palette containing the initial color. When the selected affiliated color is added to the palette, a new list of affiliated colors can be generated based at least in part on the colors in the palette, which allows the affiliated color service to continue to build the color palette. A threshold of colors may be used by the affiliated color service to stop adding colors to the generated affiliated color palette.

In some embodiments, there may be various uses of determining affiliated colors or color palettes. For example, in a merchandiser and/or electronic commerce use case, upon searching a keyword or automated input, a user may receive a list of images and/or items based on determined one or more color palettes and/or one or more affiliated color palettes. Thus, a user may be presented with one or more color palettes based on weighting and/or ranking data that enhances the commerce, curation, and/or merchandising experience (such as by providing recommendations of items). For example, the user may be exposed to a wide range of images, and/or items associated with color palettes than would otherwise be possible without the use of affiliated color palettes. User interface embodiments related to electronic commerce are described in further detail with reference to FIG. 6. In a visualization example, mood and/or setting colors or images including certain colors may be surfaced and/or presented to a user based on affiliated colors or color palettes. User interface embodiments related to various color visualizations are described in further detail with reference to FIGS. 7A-B.

At block 406, the keyword service 110 or the palette service 112 may optionally rank, select, and/or filter color palettes based on historical data. As described above and below with reference to FIGS. 8A-B and/or 9 the palette data store 118 and/or one or more color data providers 130 may store data related to votes, rankings, data entry, changes of color palettes, and/or other metadata associated with color palettes. The keyword service 110 may access historical data associated with the color palettes. For example, color palettes may be ordered and/or ranked by date of creation. Thus, the keyword service 110 may include logic and/or preferences to retrieve the newest color palettes within a time threshold. In other words, priority color palettes may be selected based on a time property and/or value associated with color palettes. In some embodiments, the keyword service may return color palettes of a particular date range. For example, for a Halloween time period, color palettes may be returned that have a creation date nearest to October. Access to historical data may also allow the identification of trending patterns associated with particular keyword searches, popularity of color palettes, changes of color palettes over time, and/or trends of any other data associated with color palettes. For example, historical data may be used to determine attitudes and perceptions of colors, and what colors coordinate with what colors, which may change over time. Historical data and/or trends associated with color palettes are discussed in further detail with reference to FIGS. 8A-B and/or 9. Thus, ranking of color palettes may be used in association with color user interfaces and/or visualizations based on keyword and/or automated input searching of color palettes.

In some embodiments, the keyword service 110 may filter and/or select color palettes by keyword and/or search phrase history associated with one or more color palettes. Filtering and/or selection of color palettes may be accomplished by accessing historical data associated with keywords and/or color palettes from the palette data store 118. The keyword service 110 and/or some other service may determine trending and/or historical patterns based on keywords and/or search phrases. For example, a keyword and/or search phrase, such as "summery," may be associated with one or more colors and/or color palettes at a particular time. At a later time, the colors and/or color palettes associated with the keyword and/or search phrase "summery" may have changed. Thus, the keyword service 110 may determine trending and/or historical patterns associated with particular keywords and/or search phrases. In the keyword "summery" example, colors and/or color palettes associated with the keyword "summery" may be trending towards light blue colors at one time, whereas in the previous year the keyword "summery" may have been associated with another color such as pink. Thus, the keyword service 110 may filter color palettes based on trends associated with keyword searches by favoring and/or preferring trending colors and/or color palette patterns. In another example, the keyword service 110 may determine color palettes associated with a search phrase based on a more recent time of creation of the color palettes and/or for color palettes created within a threshold period of time, e.g., within the last year. In some embodiments, historical data associated with color palettes may be used to predict future color trends. Historical data associated with keyword searches is discussed in further detail with reference to FIG. 9.

Example Color Palettes

Figure 5:
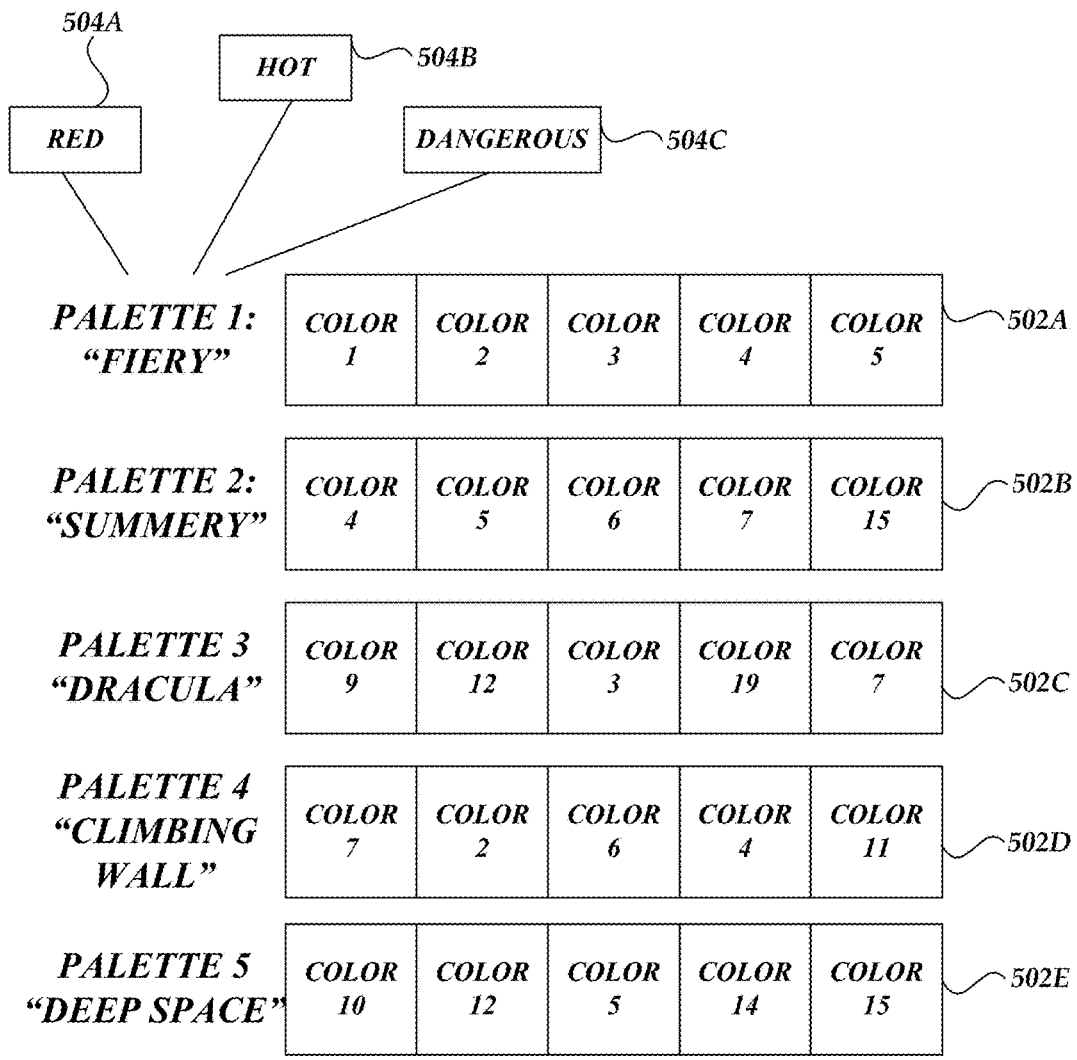
FIG. 5 illustrates example color palettes including colors and a palette name.

FIG. 5 illustrates example color palettes 502A-E retrieved by the example method 300 of FIG. 3. The color palettes 502A-E can be from a data store of human or machine-created color palettes. Each of the color palettes 502A-E include one or more colors and a name for the color palette. As described above, a name of the color palette or other data associated with the color palette may be used for searching. For example, the names "fiery," "summery," "Dracula," "climbing wall," and "deep space," may be associated with color palettes 502A, 502B, 502C, 502D, and 502E, respectively. In some embodiments, humans may assign and/or create names for color palettes.

Each color palette may be associated with one or more tags. For example, the color palette 502A, "fiery," may be associated with one or more tags including "red," "hot," and/or "dangerous" tags 504A-C. The tags may be human generated, generated by a computer system and/or some combination thereof. For example, when a human creates a color palette, the creator may associate one or more tags with the color palette. As described above, tags may be used for searching color palettes as well. In some embodiments, tagging of color palettes may be wholly or partially automated. For example, a word data store, such as a data store of synonyms, may be used to automatically tag color palettes with synonym tags based on one or more words of a color palette name. For example, synonym tags of the word "fiery" may include "flaming," "hot," or other words of the like.

In some embodiments, the colors identified in color palettes may be provided in various representations and/or formats. For example, colors 1-5 of color palette 502A may be represented by 3-dimensional RGB colors in the palette data store 118. For example, color 1 may have an RGB value (e.g., #c108e5 in hex) that includes three dimensions: the red dimension ("c1"), the green dimension ("08"), and the blue dimension ("e5"). As described above, the colors identified in color palettes may be searched efficiently using fast color search techniques as described in U.S. patent application Ser. No. 14/315,700, entitled "FAST COLOR SEARCHING," filed on Jun. 26, 2014. In some embodiments, color palettes may include any number of colors.

Example User Interfaces

Figure 6:
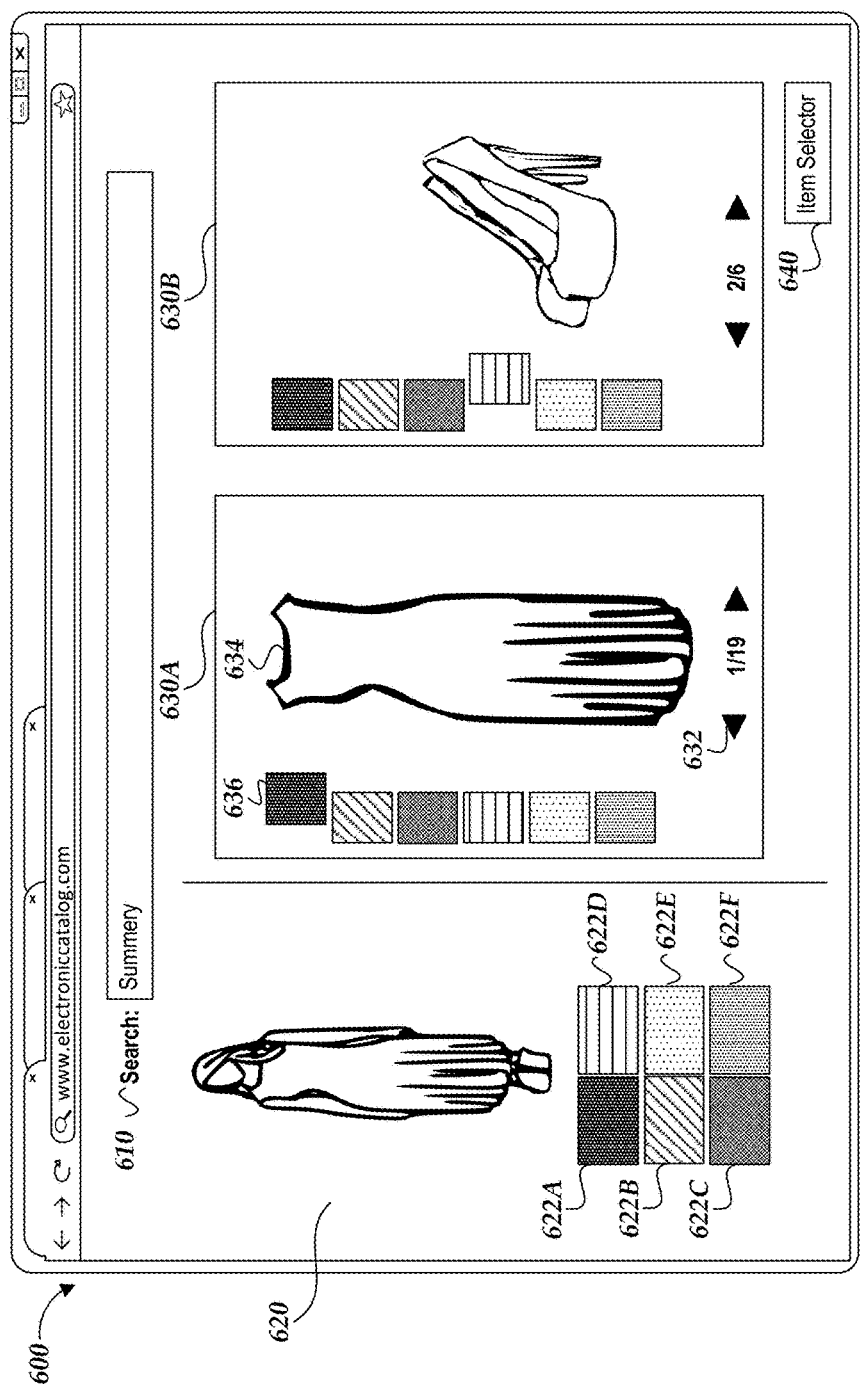
FIG. 6 is an illustrative user interface generated at least in part by a keyword service that includes an interactive configuration of images and color palettes that can be searched by keyword, according to some embodiments.

FIG. 6 is an illustrative user interface 600 generated at least in part by the keyword service 110 that includes a search section 610, a color palette section 620, item sections 630A-B, and an item selector 640. Illustrative user interface 600 may allow a user, such as a customer and/or merchandiser, to search for color palettes by keywords, view matching color palettes, and select items associated with colors of the color palettes. For example, user interface 600 may allow a merchandiser for an electronic retailer to curate a collection for an electronic catalog. As described below, many elements and/or features of the user interface 600 may be provided and/or implemented by the keyword service 110 and/or some other service with reference to illustrative method 300. It will be appreciated that while embodiments herein are often described with respect to clothing, this is for illustrative purposes and is not meant to limit the scope of the presentation or searching techniques described herein, which can be used to accommodate other types of images and items as well. For example, collections of interior decoration, furniture, car styling, paint schemes, to name a few, could also benefit from the efficient data and/or color palette searching discussed herein.

As illustrated, a user may enter a keyword and/or search word or words into search section 610, here "summery." The keyword service 110 may receive the search word and return one or more color palettes in the color palette section 620 based at least in part on the search word. The provided color palette may include colors 622A-F. The user interface may provide item section 630A and item section 630B to allow a user to select one or more items that have colors 622A-F. For example, items presented in section 630A and 630B may have been determined and/or returned by the keyword service 110 from the item data store by matching the one or more colors 622A-F. In some embodiments, as illustrated in item section 630A, a user may select a color selector 636 of the color palette to preview the item 634 in the particular color, here color 622A. Navigation selector 632 of the item section 630A may allow a user to navigate through different items and/or styles associated with the item. For example, a user may navigate with navigation selector 632 to view nineteen different dresses of and/or sufficiently close to the selected color. In some embodiments, the items presented may be filtered and/or ranked based on trending data such as purchase history data, popular keyword searches, and/or items associated with popular color palettes.

In some embodiments, the user interface allows selection of other items. Item selector 640 may allow a user to select additional items. For example, upon selecting item selector 640, a user may be visually presented with different types of items for future selection. In the illustrated clothing example, additional items may include watches, accessories, boots, shirts, pants, jackets, and/or other items not currently presented. Similar to item section 630A or item section 630B, an additional item section may be presented in the user for selecting items of one of the colors 622A-F. As a result, a user may be able to assemble a collection of items of colors corresponding to a color palette search result. In some embodiments, color names may be presented to the user with reference to colors 622A-F.

In other embodiments, a user may search a personal data store of images based on keyword searches associated with colors of the images. For example, where a user searches "fiery," color palettes may be retrieved matching that keyword. Images from a library and/or data store may be retrieved that are associated with the one or more colors from the color palettes. For example, images in a photography library may correspond to color photographs of persons, buildings, places, and/or objects in the world. Using the systems or techniques described in U.S. patent application Ser. No. 14/316,483, entitled "IMAGE-BASED COLOR PALETTE GENERATION," filed on Jun. 26, 2014, colors may be extracted from images, such as photographs of friends in social settings, such that the images may have representative one or more colors extracted from the images that may be used for keyword searching of color palettes.

Figure 7A:
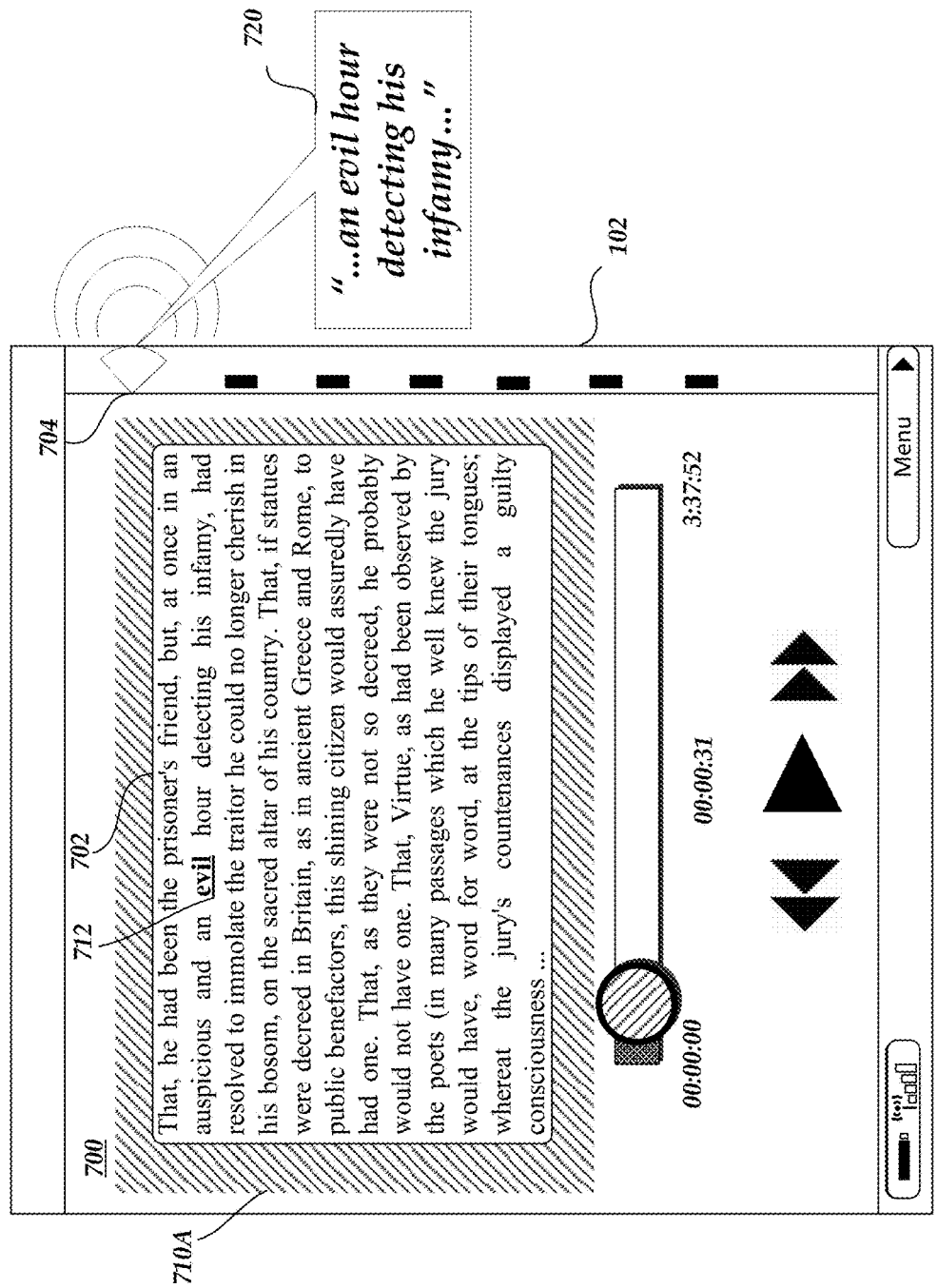
FIGS. 7A-B illustrate an example sequence of user interface representations illustrating color visualizations based on keywords related to color palettes of audio and/or text content, according to some embodiments.
Figure 7B:
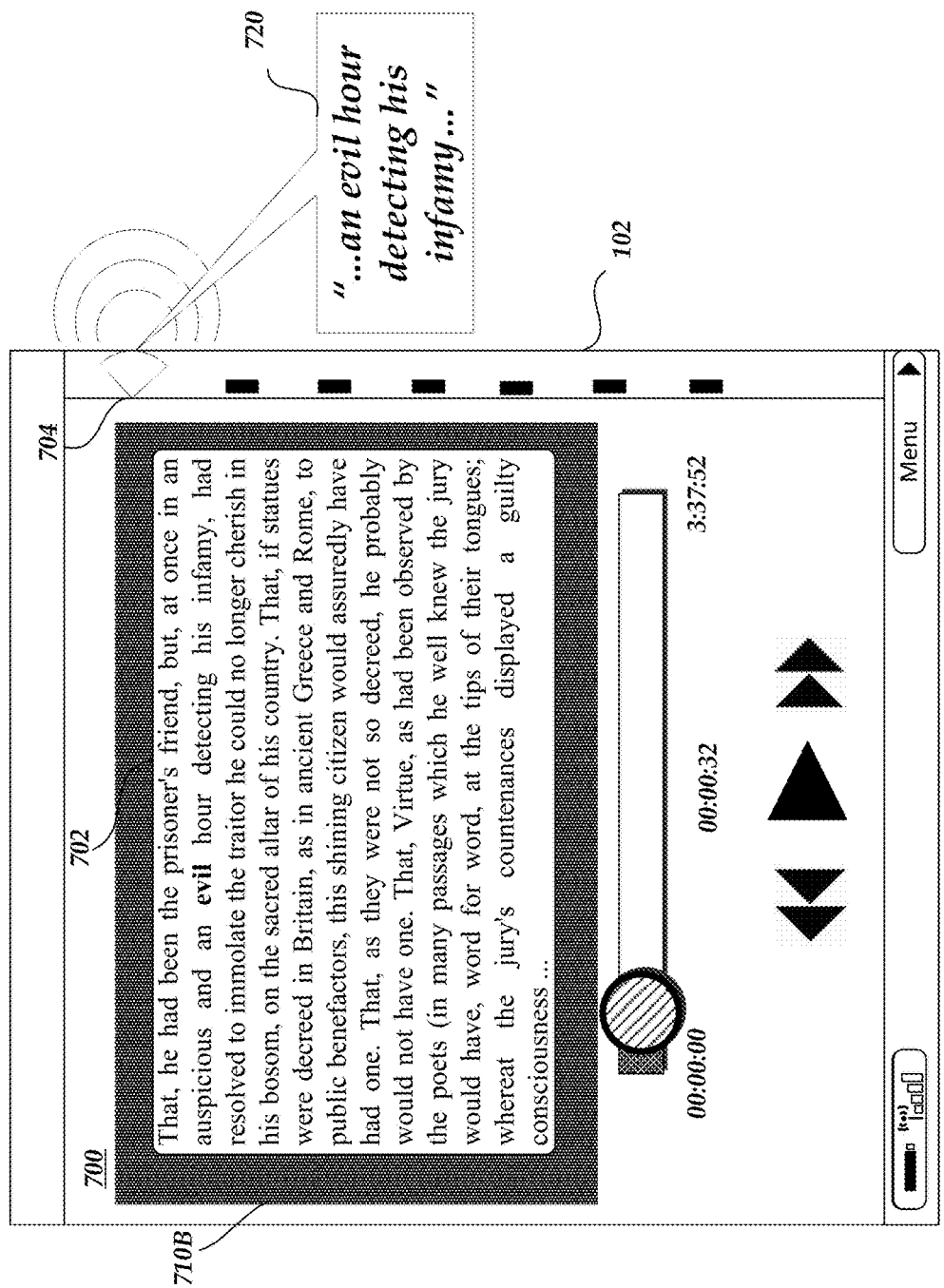

FIGS. 7A-B illustrate an example sequence of user interface representations illustrating color visualizations based on keywords of audio and/or text content. Such visualizations may provide mood, lighting, setting, atmosphere, and/or surface colors associated with the audio and/or text content that enhance the user experience with a user interface. As illustrated, the user interface 700 may be displayed on user computing device 102. The user interface may be generated at least in part by the user computing device 102 and/or the keyword service 110, depending on the embodiment. As illustrated, user computing device 102 may aurally present audio 720 corresponding to words via one or more speakers 704 and/or one or more audio outputs, which may be provided to speakers or headphones. Example user interface 700 additionally includes a displayed portion of the text content 702, which represents text of the spoken words of the audio data (such as an audiobook). Text content 702 is shown for illustrative purposes only and may not be displayed in other embodiments. The audio 720 presented in the illustrated example includes narrated audio content, which are the spoken words or phrases "an evil hour detecting his infamy."

The example user interface 700 includes color area and/or color visualization 710A. Data corresponding to the color area 710A may be retrieved and/or generated at least in part by the keyword service 110. For example, the text content 702 may include one or more words. The one or more words and/or current playback of the one or more words may be received by the keyword service 110 as input for searching and/or retrieving one or more color palettes as described herein. Text content 702 may include the word "evil" 712. The keyword service 110 may identify color palettes with names including word 712 and/or related to word 712. As illustrated, one or more colors 710A associated with the color palette may be visualized during current playback of the audio or text content. Thus, color may be used to enhance the user experience with color effects. Other techniques, as described herein, may be used for identifying color palettes associated with keywords such as presenting color visualizations associated with the affiliated colors or palettes based on the previously searched and/or determined color palette. Also, it will be appreciated that color visualization 710A may include images of colors associated with a color of a color palette, for example, images with extracted colors, such as images from a user's photograph album.

In some embodiments, color visualizations based on keywords may be used for different user computing devices and/or other media content with associated textual content. For example, a song may be played on user computing device 102 and the song may be associated with text corresponding to the lyrics of the song. Other examples of continuously-presented content with associated textual content may include podcasts, news programs, musical works, electronic books, television programs, video clips, movies, multimedia content, video games, and other types of content. Likewise, the associated textual content may include any type of digital textual content that is associated to the item of continuously-presented content, such as an electronic book, closed caption content, screenplay, script, libretto, transcription (e.g., speech-to-text) or other textual content. As will be appreciated, in some embodiments, textual content representing words spoken in various types of audio content may be determined dynamically using speech recognition and/or other known methods. Accordingly, in some embodiments, textual content for a given portion of audio content may be determined dynamically for keyword searching. For example, instead of using speech recognition for an entire song, which may be computationally expensive, the song may be sampled with speech recognition techniques, at regular intervals, to retrieve textual keywords at intervals that may be used to retrieve color palettes.

As illustrated in FIG. 7B, different colors of a color palette and/or affiliated color palettes may be presented to the user. For example, as playback continues of the media content, the color visualization 710B may have changed from color visualization 710A of FIG. 7A. The searched color palette corresponding to the identified keyword may include colors corresponding to color visualizations 710A and 710B. As playback continues the keyword service 110 may determine other words for searching for color palettes. In some embodiments, words may be selected at random and/or at predefined and/or configurable intervals. In some embodiments, the weighting and/or ranking data associated with color palettes and/or affiliated color palettes may be used to select preferred color palettes for color visualizations. In some embodiments, color palettes may be retrieved for a series of words in text content 702. The keyword service 110 may then retrieve the most frequent and/or dominant colors in the respective color palettes such that the associated color visualizations represent and/or associated with a majority of the words in a section of text content 702.

In some embodiments, color visualizations may be based on keywords from detected and/or input audio. An input device of user computing device 102 may detect and/or receive audio input data. For example, a microphone and/or other input device of user computing device 102 may detect ambient music and/or audio. One or more techniques, such as voice and/or speech recognition, may be used to convert the detected audio into one or more keywords and/or words. Thus, the keyword service 110 may use the color visualizations techniques described herein to cause the home screen and/or display of a user computing device 102 to present various color visualizations in response to detected audio such as ambient music (playing outside of the user computing device 102) or a conversation of persons nearby.

Example Color Palette Historical Data

Figure 8A:
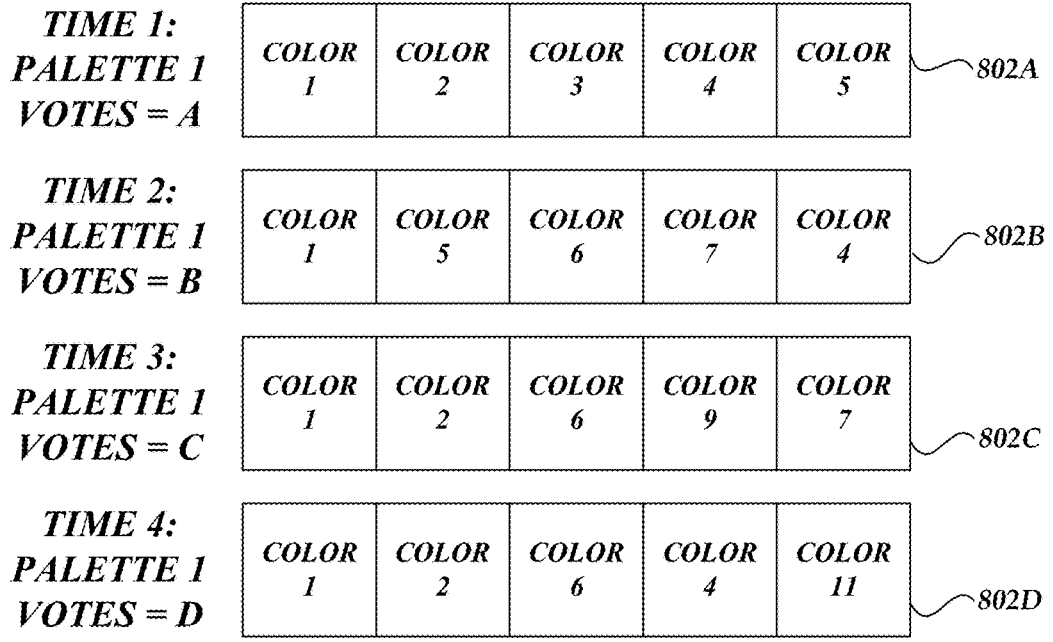
FIGS. 8A-B illustrates example color palettes associated with historical data.

FIG. 8A illustrates an example color palette associated with historical data. Aspects of color palette 802A-D may be similar to the color palettes of FIG. 5. However, in some embodiments, color palette 802A-D may be further associated with historical data. As illustrated, color palette 802A-D may be the same color palette, "palette 1," over time. For example, "palette 1" may be associated with times and/or dates one, two, three, and four, which correspond to the color palette 802A, 802B, 802C, and 802D.

Voting, ratings, and/or ranking data may also be associated with color palettes. As used herein, the terms votes, rating, and/or ranking are used to indicate that there is a value associated with the palette where the value is indicative of a level of human preference for the palette (such as contributed by a community of users and/or color data providers 130). For example, "palette 1" may be associated with ratings A, B, C, and D, which correspond to the color palette 802A, 802B, 802C, and 802D. Ratings A, B, C, and/or D may be relative to each other. In other words, A may have a greater rating than C, C may have a lower rating than B, etc. The rating of a color palette can be based on a number of votes, such as where a palette's score can be incremented by a value according to a positive vote by a user, or similarly decremented by a value according to a negative vote by a user. Similarly, the rating of a color palette can be based on a rating system where users can rate palettes on a rating scale (e.g., 0 to 5, 1 to 5, 0 to 10, −5 to 5, etc.). Likewise, the rating of a color palette can be based on users ranking palettes relative to one another. Rating and/or ranking may also be determined by a number of views and/or hits. The ratings of the color palettes may also be associated with a time because each color palette may be associated with a creation time, last update time, etc. Thus, the keyword service 110 may use the time associated ratings to identify trends in color combinations and/or to identify color combinations, which are relatively stable over time (e.g., classic color combinations). This can also be used to determine color combinations, which were popular at a particular time. It will be appreciated that various types of trending and/or historical analysis may be performed on the historical data. For example, for a particular keyword associated color palette (e.g. "springtime"), the changes in colors associated with that color palette may be determined over time.

By using the votes of a community of users, the generated color palettes represent a subjective color combination that may be different from what a mathematical formula and/or machine may provide and which is generally preferable to users. Using human arbiters to generate color combinations can provide color palettes that mathematical algorithms and/or machines may be incapable of fully determining and/or creating.

As illustrated, the color palette data store may store historical data associated with color palette 802A-D. In some embodiments, there may be differences regarding how historical data associated with color palettes is stored. For example, base data associated with the color palette may be stored and historical data may be stored as changes from the base data, such that a color palette at a point time may be determined by iterating through the changes over time. In some embodiments, historical data of color palettes may be stored as snapshots in time (e.g., each color palette may be associated with one or more timestamps in a data store). For example, a single data store query and/or look up at time four for "palette 1" 802D may retrieve all of the data associated with the color palette if they are stored as discrete snapshots, records, and/rows in a data store associated with times, dates, and/or timestamps.

Figure 8B:
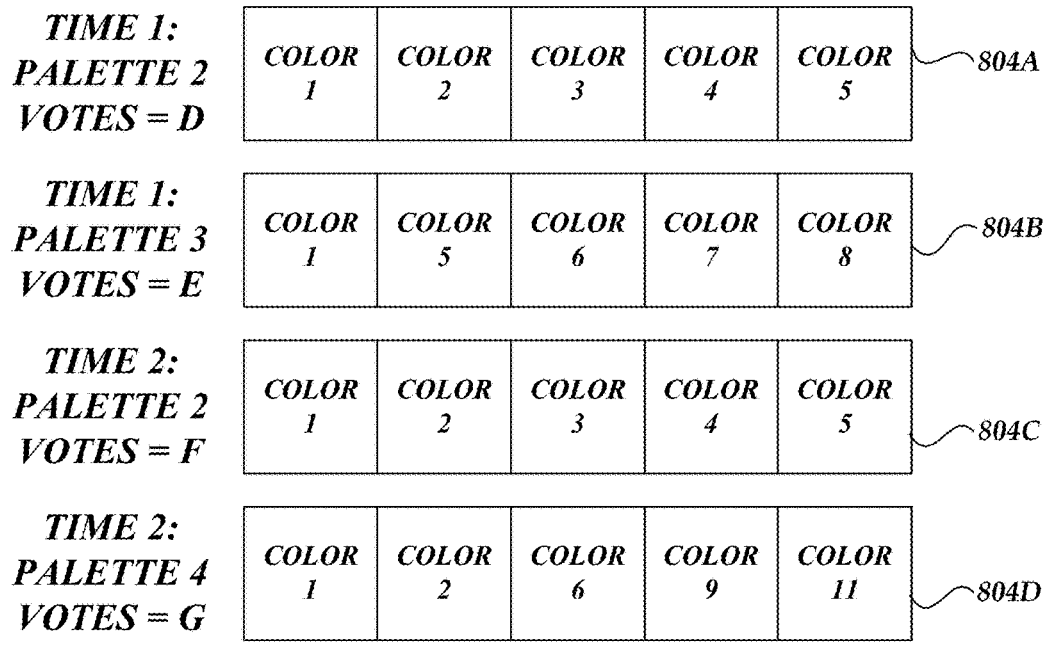

FIG. 8B illustrates example color palettes associated with historical data. Aspects of color palettes 804A-D may be similar to the color palettes of FIG. 5 and/or FIG. 8A. However, as illustrated in FIG. 8B, a plurality of color palettes associated with votes and/or times (e.g., creation time of a color palette, last update time of a color palette, etc.) may be compared with each other. For example, if a keyword search matches both palette 804C and 804D, palette 804D may be returned if votes G are greater than votes F. In some embodiments, votes may be weighted by date. For example, if a keyword search returns color palettes 804B, 804C, and 804D, with votes of 4, 1, and 1, respectively. Color palettes 804C and 804D may be rated and/or weighted higher than color palette 804B because color palettes 804C and 804D are more recent in time than color palette 804B. The keyword service 110 may also filter and/or have thresholds based on time for returning color palettes. For example, color palettes older than one year may not be returned.

FIG. 9 illustrates example color palettes associated with historical keyword data. Aspects of color palettes 902A-D and/or 904A-D may be similar to the color palettes of FIG. 5 and/or FIG. 8A-B. As illustrated in FIG. 9, a keyword and/or search phrase 910, here "springtime," at time one, may be associated with color palettes 902A-D. As previously discussed, the keyword and/or search phrase may be associated with color palettes 902A-D based on one or more color palette names and/or other data associated with the color palettes. As illustrated, at time one, the search phrase 910 may be associated with color palettes that have common aspects. For example, color palettes 902A-D may share a common color, here color one, which may correspond to a yellow color. Thus, at time one, the search phrase 910 may be associated with a yellow color. As illustrated, at time two, the search phrase 910 may be associated with color palettes 904A-D. There may be some overlap and/or differences between color palettes 902A-D and/or color palettes 904A-D. In other words, the search phrase at different points in time may be associated with same and/or different color palettes. In the example, palette one is both associated with time one and time two. However, some colors of palette one at time one may have changed at time two, as illustrated by color palettes 902A and 904A, respectively. Furthermore, some color palettes 904B-D may be associated with search phrase 910 at time two that were not associated with the search phrase 910 at time one. Lastly, a particular color may be associated with the search phrase 910 at time two that was not associated with the search phrase 910 at time one. For example, color palettes 904B-D may include the color thirteen (e.g., a green color), which was not associated with the color palettes at time one.

In some embodiments, the keyword service 110 and/or some other service may determine, select, and/or filter collections of color palettes based on the historical data associated with keywords and/or search phrases. As illustrated by FIG. 9, historical data associated with keywords and/or color palettes may indicate one or more color trends, trends in color preferences, and/or colors associated with keywords over time. In the example, the search phrase "springtime" 910 at time one was associated with a yellow color and/or at time two, the search phrase 910 was associated with a green color. Thus, the keyword service 110 may filter out color palettes and/or update a set of color palettes that do not match one or more color trends and/or may prioritize color preferences that correspond to the current color trends associated with the search phrase. For example, in some embodiments, the keyword service 110 may not return palette one (or may provide it a lower ranking) based on the search phrase 910 because palette one may be outside and/or not match the one or more color trends. In some embodiments, the keyword and/or search history techniques may be combined with other methods and/or techniques described herein, such as, but not limited to, affiliated colors, trending of palettes, ranking of palettes, and/or visualizations of color palettes.

In some embodiments, collections of color palettes associated with keywords and/or search phrases may be determined based on predictive models of color trends. One or more techniques for color manipulations, addition, subtraction, and/or predictive models may be used to select and/or determine color palettes. For example, color palettes associated with a search phrase at a time one may be predominantly red and color palettes associated with the same search phrase at a time two may be predominantly pink. Thus, the keyword service 110 and/or some other service may determine a color trend towards lighter colors within a red color space and/or range. As a result, the keyword service 110 may select and/or determine color palettes with colors lighter than pink for the search term at times one and two. In other words, the keyword service 110 may determine color trends of increasing lightness or darkness based on changes in colors and/or color palettes over time. Alternatively and/or additionally, color techniques such as color addition (adding red and green to make yellow), color subtraction (subtracting blue from yellow to make green), and/or vector math may be used to determine future color trends of color palettes. For example, color palettes associated with a search phrase at time one may include the color red, color palettes associated with the same search phrase at time two may include the color green. Thus, the keyword service 110, in response to receiving the same search phrase, may determine color palettes that include the color yellow because adding red to green makes yellow, which would comprise a predicted color trend.

In some embodiments, metadata associated with color palettes and/or search phrases may be used to determine color trends. For example, color palettes associated with the search keyword "Autumn" may trend towards more brown and/or orange colors at particular times and/or months during the year. Thus, cyclical patterns of color trends may be used to determine, predict, and/or select color palettes associated with particular keywords and/or phrases. Other metadata associated with color palettes and/or search phrases, which may be used for color trends, includes geolocation data, purchase data, and/or tags associated with data stores of images. For example, users may tag and/or label images with a particular keyword and/or phrase. If a user requests color palettes associated with the particular keyword and/or phrase, colors extracted from those images may be used by the keyword service 110 to select one or more color palettes with those colors. Thus, trending data associated with images tagged by keywords may be used to determine color palettes based on keyword searches with similar words to the words of the image tags. Trending geolocation data may include color palettes associated with particular regions or countries (e.g., color trends associated with a search phrase of "Big Ben" may be determined from color palettes created in England). Trending purchase data may include sales data and/or popular items associated with images comprising one or more colors. Thus, color palettes may be selected based on keywords associated with high selling items and with colors similar to the colors extracted from images of those high selling items.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain aspects described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

It should be emphasized that many variations and modifications may be made to the above-described embodiments, the elements of which are to be understood as being among other acceptable examples. All such modifications and variations are intended to be included herein within the scope of this disclosure and protected by the following claims.

Generally described, aspects of the present disclosure relate to creating a fast color search data store and/or performing a fast color search by one or more computing devices. Searching by color (e.g., a specific RGB color or a RGB color range) in a structured data store can be challenging due to the multidimensional nature of colors. Such a data store may include 3-dimensional RGB colors that are associated with objects in a relational database or some other type of data store. For example, the RGB color value (e.g., #c108e5) may be stored in the data store in association with a green dress, a green image, or any other data object with a green association.

The RGB color values in such a data store may be indexed for searching. A data store index may be a data structure that improves the speed of data retrieval operations on a data store table at the cost of additional writes and the use of more storage space to maintain the extra copy of data. Indexes are used to quickly locate data without having to search every row in a data store table every time a data store table is accessed. Indexes can be created using one or more columns of a data store table, providing the basis for both rapid random lookups and efficient access of ordered records. Such an index on a traditional integer field may allow for quick lookups within an integer range. For example, on an indexed integer field, a search of "between 2000 and 3000" may quickly return all records with integer fields between 2000 and 3000, and can be orders of magnitude faster than a comparison of integer values in all rows.

However, an index of an n-dimensional color value, such as an index of an RGB field, does not assist or speed up searching n-dimensional color ranges. In many scenarios, an RGB color value may be associated in a data store with object records in a data store. The RGB field may also be indexed. However, traditional data stores do not inherently index an RGB field correctly. For example, an RGB value (e.g., #c108e5 in hex) includes three dimensions: the red dimension ("c1"), the green dimension ("08"), and the blue dimension ("e5"). The bits in these separate hex values are arranged by dimension, but are not arranged in highest order to lowest order across all dimensions, which makes range comparisons difficult to perform with a single index. For example, the red dimension's bits in RGB come first, which includes both high order red bits through low order red bits. This is followed by green high order bits through low order bits, which is again followed by blue high order bits down to low order bits. Thus, if a color search range was specified as (#c001e0 through #cf10f0), a single traditional index cannot be used to quickly determine which of the records have associated colors within the range because such a lookup is dependent on an index data structure where all the bits in a field are ordered from highest to lowest order (e.g., usually an integer value or similar data type).

One way to solve this problem may be to have multiple index fields in a data store corresponding to each of the dimensional colors. For example, there may be one field for red (e.g., which may contain as a part of one record the value "c1"), another for green (e.g., which may contain as a part of one record the value "08"), and yet another for blue (e.g., which may contain as a part of one record the value "e5"). Each of these fields may be indexed individually. Thus, when ranges are searched, each index may be used for comparison to the indexed individual colors (e.g., for the range #c001e0 through #cf10f0, the range "c0" through "cf" may be applied to the red index, the range "01" through "0f" may be applied to the green index, and the range "e0" through "f0" may be applied to the blue index). The data store must then determine whether all three indexes indicated that a record was within the respective ranges.

The downside to the foregoing type of dimensional indexing is that a data store must search three indexes instead of one, and then make a comparison of whether all the criteria have been met for all indexes. This procedure is usually less efficient than using a single index to perform a search.

The embodiments described herein allow for increased query speed and fast searching, and overcome many of the drawbacks described above. More generally, in addition to color spaces, the techniques described herein may allow for fast searching of any multi-dimensional space, such as a traditional 3-dimensional coordinate space. For example, in a 3D video game, objects may be located in a 3-dimensional coordinate space on a map (e.g., an X horizontal dimension, a Y depth dimension, and a Z vertical dimension, where each dimension is orthogonal to the other dimensions). In such a video game, a fast searching technique that collapses a 3-dimensional coordinate search range into interleaved one-dimensional integer search ranges, as described herein, may be used to quickly find video game objects within the 3-dimensional coordinate search range.

In one embodiment in accordance with the present disclosure, an n-dimensional color space can be converted into a 1-dimensional color space. For the sake of brevity, although the embodiments described herein often refer to RGB color, which is a 3-dimensional color space, other dimensional color spaces (e.g., 4 or 5 dimensions, etc.) may use one or more of the same techniques described herein to gain the same advantages described for the RGB 3-dimensional color space. Thus, the same or similar techniques may be applied to the color spaces of XYZ, Hue Saturation Brightness/Luminance (HSB/HSL), Hue Saturation Value (HSV), Hue Saturation Intensity (HIS), Cyan Magenta Yellow Key (CMYK), Lab, Lightness Chroma Hue (LCH), LMS, YCbCr and Y'CbCr as used in image or video, Tint Saturation Lightness (TSL), Red Green (RG), YIQ (as used by NTSC color TV system), and YUV (as used by the PAL color TV system). As would be recognized by one skilled in the art, in color spaces that do not use an integer format for a color dimension, the techniques described herein may still be applied by converting a floating point dimension value to an integer dimension value.

Each of the colors in the RGB color space, namely red, green, and blue, can be represented by a single byte of data (8 bits). By interleaving the three colors of bits (e.g., where each character represents one bit: RGBRGBRGBRGBRG-BRGBRGBRGB as will be further described in reference to FIG. 12), one can form a 24 bit integer that is uniquely representative of each color yet has only a single dimension. One advantage of interleaving the RGB bits is that the order of importance of the bits is preserved. Generally, colors which are close in terms of human perception are also close together on this integer range (e.g., they tend to have the same higher order bits).

One advantage of preserving the order of the bits is that such ordering effectively represents the 3-dimensional color values distance from black (i.e., #000000) and white ((i.e., #FFFFFF). Higher order bits generally indicate a larger distance from black (i.e., closer to white), whereas less high order bits and more low order bits generally indicate a greater distance from white (i.e., closer to black). Thus, in effect, the interleaved values may be considered grayscale values.

For each color in a data store, a column may be added to hold its equivalent 24 bit interleaved integer. A standard data store integer index may be added to a table with this column. Such an index on an interleaved color value may be considered a grayscale index value. When a search is performed based on an RGB color range, preprocessing may occur that converts the color range to a plurality of interleaved color ranges. The preprocessing may determine one or more binary splits in each individual color byte. For example, if the red color range runs between "00001110" and "00010001," then the preprocessing may convert the red color search into two ranges ("00001110" to "00001111") and ("00010000" to "00010001") that can be permuted (and interleaved) with the determined ranges from the other colors green and blue.

Figure 10:
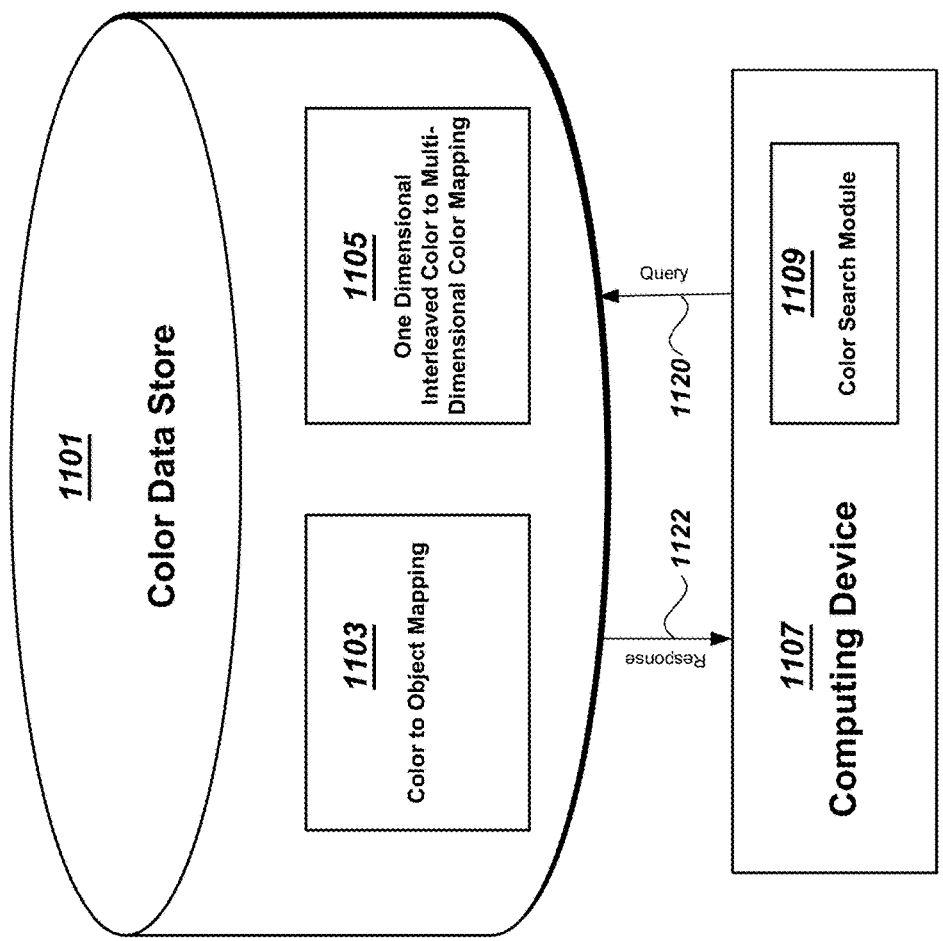
FIG. 10 is a block diagram depicting an illustrative network topology of a fast color searching system.

Turning now to FIG. 10, a block diagram is shown that illustrates a color data store 1101 that is searchable by a computing device 1107. Color data store 1101 may be any type of data store that allows for integer indexing, including a relational database such as an SQL database, or a hierarchical data store. Color data store 1101, while stored on one or more non-transitory, computer readable media, may include one or more logical data stores, each logical data store including one or more data store tables. Color data store 1101 may be implemented in a single computing device capable of executing software instructions to provide data store services, and/or many computing devices capable of together providing data store services (e.g., allowing for mirroring, backups, etc.). In yet other embodiments, color data store 1101 may be implemented as a web service or by one or more virtual machines in a hosted computing environment. The hosted computing environment may include one or more provisioned and released computing resources, which computing resources may include computing, networking and/or storage devices.

Color data store 1101 may include one or more tables with color columns. For example, table 1103 may include a plurality of records, each record including data for an object (or a reference to an object such as an object identifier) and associated with an RGB color. For example, each object reference in table 1103 may identify an item that one can buy on a network site (a jacket, a book, a stapler, a service, etc.). The item's data may be in table 1103 or in a separate table or data store accessible via the item's identifier. Each item may be associated with one or more RGB colors in the table (e.g., a color mapping). The colors associated with the object may be derived by analysis of a picture of the object. Various methods and systems for extracting colors from an image are described in U.S. patent application Ser. No. 14/316,483, entitled "IMAGE-BASED COLOR PALETTE GENERATION," filed Jun. 26, 2014; U.S. patent application Ser. No. 14/316,530, entitled "IMAGE-BASED COLOR PALETTE GENERATION," filed Jun. 26, 2014; U.S. patent application Ser. No. 14/316,528, entitled "IMAGE-BASED COLOR PALETTE GENERATION," filed Jun. 26, 2014; and U.S. patent application Ser. No. 14/316,549, entitled "IMAGE-BASED COLOR PALETTE GENERATION," filed Jun. 26, 2014, each of which is incorporated by reference herein in its entirety.

In some embodiments, table 1103 may contain one or more mappings of an object to a color. Multiple rows in the data store may indicate that an object, such as an image object, is mapped to RGB coded colors for pinkish/purple, Easter blue and forest green for instance. Thus, a query of table 1103 on a specific color may reveal one or more objects/items mapped to that color in the data store.

In the same table, or a separate table, such as table 1105, the RGB colors may be mapped to a one dimensional integer value. The one dimensional integer value may include interleaved bits of the RGB coded colors. For example, if the color coding for Easter blue is #44EDE5, then the interleaved 24 bit integer may look like 011111011000010111000011 (as represented in bits). Interleaving is further described with reference to FIG. 12 described herein. In some embodiments, tables 1103 and 1105 may be the same, where objects may be mapped directly to the flattened one dimensional 24 bit integer representation of a color.

The data store table(s) may be queried using the 24 bit integer to determine one or more objects associated with a color. In some embodiments, the data store 1101 may receive an SQL query to determine if one or more objects have an associated color within the color range. For example, an SQL "where" clause statement may be a parameter that is used to search on a color range (e.g., "where 24intcolor between '239874' and '736583'"), where values in column "24intcolor" are the interleaved 24 bit colors. Using a mapping of the 24 bit color to the RGB color (or, in some embodiments, simply mapping straight to an object) allows the data store to identify and return those objects that are associated with the range of colors searched.

Color data store 1101 may be connected to many devices, directly or indirectly, on a network (e.g., a private network, the Internet, etc.) that allows the data store to receive queries and transmit search results. The data store may be one device (e.g., a data store server), multiple devices, or in remote computing devices such as remotely hosted on the Internet/cloud.

Computing device 1107 may be able to issue a query 1120 and access the data store 1101 via networking such as IP networking (Internet, intranet, combination of both, etc.). Computing device 1107 may be a server (or a server farm or hosted computing device(s)) that has received a client color inquiry, processed the inquiry via a color search module 1109, and generated one or more interleaved color ranges as described herein. The query 1120 may then be sent to the data store 1101 for resolution. The data store 1101, after receiving the query 1120 (e.g., an SQL query), may process the query 1120 and return a response 1122 including search results after comparing the interleaved color ranges to the interleaved color ranged index (e.g., included in table 1105). Such a comparison may result in one or more matching colors or objects (e.g., items or images) that may be returned in a response 1122. The computing device 1107 may then use the returned colors and/or objects for any purpose (e.g., returning an item to a client device, showing matching colors to a user that falls within the specified range, etc.).

In some embodiments, color data store 1101 may be connected to computing device 1107 directly rather than through a traditional communication network. For example, the computing device 1107 may store color data store 1101 and execute a data store process to answer queries, as well as execute network server (or other server) processes to accept user color queries through the Internet, or through a local user interface. The color search module 1109 may then process the color queries, send interleaved color ranges to the data store processes, and receive a response.

In some embodiments, the computing device 1107 may include a user device (e.g., a home or office computer, smartphone, tablet, a wearable computing device, etc.) that includes an arrangement of computer hardware and software components such as a processing unit, a network interface, a non-transitory computer-readable medium drive, and an input/output device interface, all of which may communicate with one another by way of a communication bus. The network interface may provide for connectivity to one or more networks or computing systems. The processing unit may thus receive information and instructions from other computing devices, systems, or services via a network. The processing unit may also communicate to and from memory and further provide output information via the input/output device interface. The input/output device interface may also accept input from various input devices, such as a keyboard, mouse, digital pen, touch screen, etc. The memory of the computing device 1107 may contain computer program instructions, such as the color search module 1109, that the processing unit may execute in order to implement one or more embodiments of the present disclosure. The memory generally includes RAM, ROM and/or other persistent or non-transitory computer-readable storage media.

In addition, the memory may include a user browser. The user browser may have contacted a network site, e.g., a website, and loaded a graphic user interface based on information received from a remote server. The user browser may be used to initiate a search. For example, the user browser may obtain a color range to search, and in some embodiments additional search parameters, such as keywords, item price, type of item/object, etc. Such additional parameters may be used to further filter the search results in addition to color. The color search module 1109 may execute on the computing device 1107, either within the browser (e.g., via a JAVASCRIPT® module) or outside the browser to preprocess the range and generate one or more interleave ranges to search via the color search query 1120. At this point, the query 1120 may be sent to the color data store 1101, processed via comparison of the 24 bit integer color index to the 24 bit interleaved search ranges, and a response 1122 generated and sent back to the computing device 1107. The response 1122 may be further filtered based on additional query parameters described above. Once the response 1122 is returned, the browser or other process may generate a graphical user interface to display and/or interact with one or more of the search results.

Search performance for color data store 1101 may be improved by implementing color data store 1101 across multiple sub-data store systems. In such a scenario, each sub-data store that makes up color data store 1101 may be responsible for answering queries for specific, predefined color ranges. By way of example, in a simple scenario, color data store 1101 could be implemented by using three sub-data stores. Each sub-data store may be configured to receive queries for specific interleaved color ranges, such as sub-data store #1 responding to queries where the flat one dimensional color starts with a "0" highest order bit, sub-data store #2 responding to queries where the flat one dimensional color starts with a "10", and sub-data store #3 responding to queries where the flat one dimensional color starts with "11."

The ranges assigned to each sub-data store may be configured manually, or automatically, based on the density of index color values within each sub-data store. In one embodiment, an algorithm may configure a sub-data store to handle a larger, sparsely-populated color range, and configure another sub-data store to handle a smaller, but more densely-populated, color range. Such an algorithm may be executed without human intervention so as to adjust each sub-data store on the fly based on the population of possible results within specific color ranges. This approach may spread out the records in color data store 1101 across the sub-data stores according to the processing power of each sub-data store.

In a multiple sub-data store scenario, a computer creating a search query may then craft separate queries for each sub-data store system, send them out in parallel to each sub-data store system, and receive results in parallel. This parallelism may create a performance increase by querying multiple, smaller sub-data stores at the same time.

The color data store 1101, and in particular, a table (such as table 1105) that includes a one dimensional interleaved color mapping (e.g., a 24 bit interleaved integer) to a multi-dimensional color mapping (e.g., RGB color or an item with an affiliated color) may be generated to support fast color queries as described below in FIG. 2.

Figure 11:
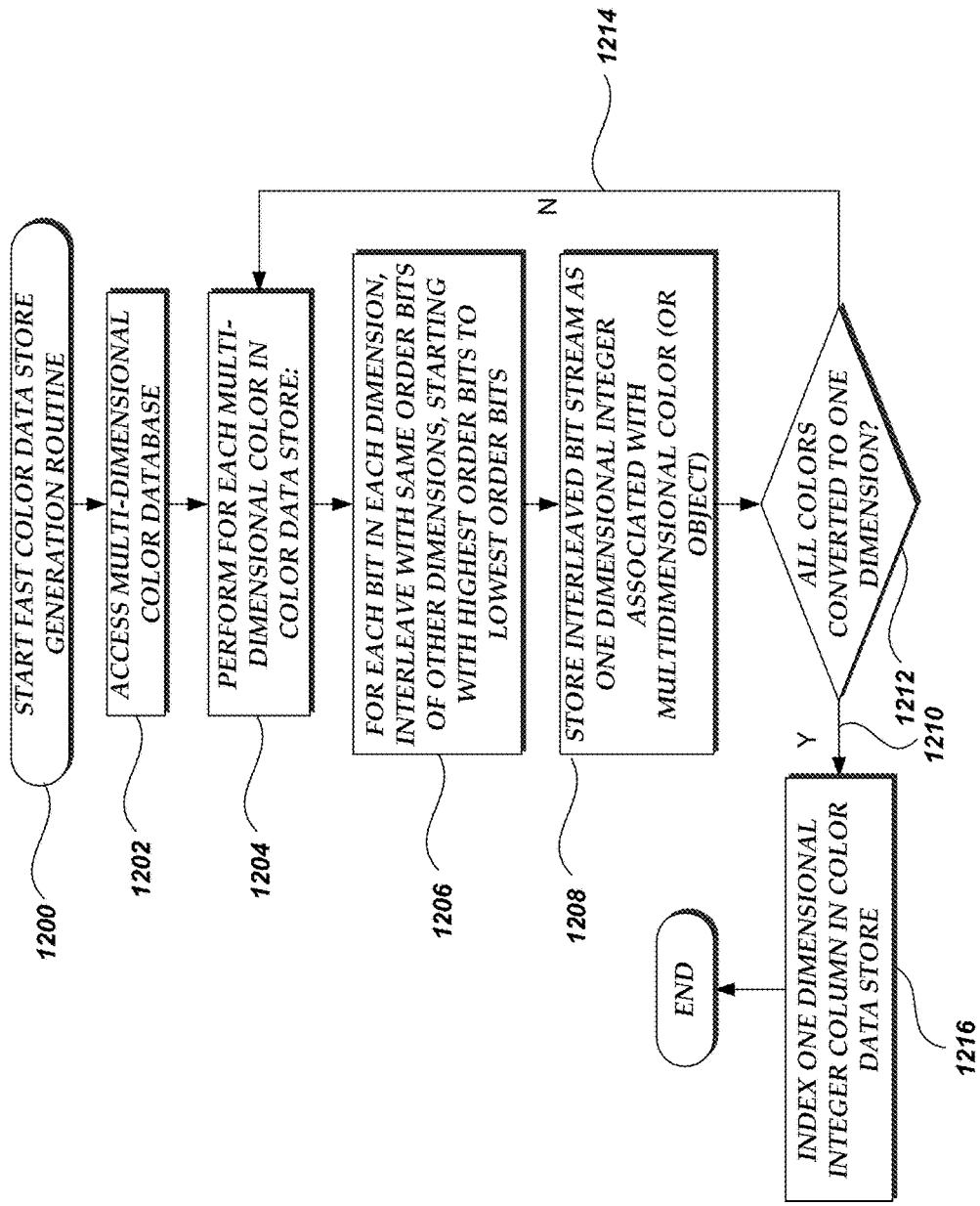
FIG. 11 is a flow diagram illustrating an example of a process for generating or configuring a fast color search data store included in FIG. 10.

With reference now to FIG. 11, an embodiment of a fast color data store generation routine 1200 is implemented by an accessing computing device, such as the computing device 1107, will be described. One skilled in the relevant art will appreciate that actions/elements outlined for routine 1200 may be implemented by one or many computing devices/components/modules that are associated with the computing device 1107, such as the color search module 1109, or associated with the color data store 1101. Accordingly, by way of example, routine 1400 has been logically associated as being performed by the computing device 1107.

At block 1202, a computing device 1107 may access the color data store 1101 (e.g., login to the data store or otherwise prepare to perform queries and store data in the data store). The accessing computing device may be computing device 1107, or any other computing device capable of interacting with the color data store 1101, including any computer device that implements the color data store 1101.

Figure 12:
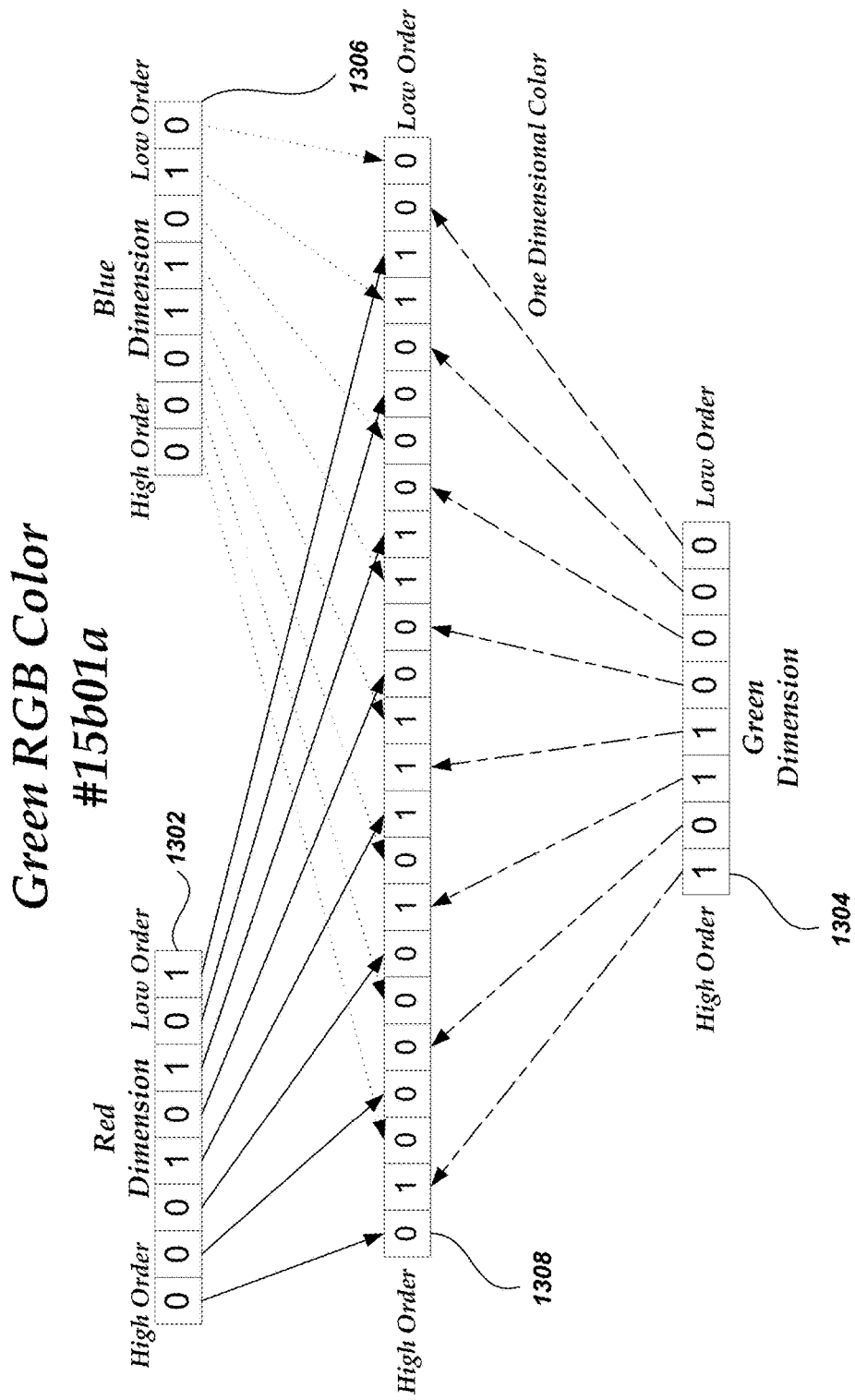
FIG. 12 is a schematic diagram illustrating an example of interleaving bits to transform a multi-dimensional color model to a one dimensional representation of a color.

At block 1204, the computing device 1107 may query and access each color used or available in the color data store 1101. Then, at block 1206, for every color in the multi-dimensional color data store 1101, the computing device may interleave the bits from each dimension of the multiple dimensions in the color data store 1101. For example, as illustrated in FIG. 12, which is further discussed below, the red dimension bits, the green dimension bits, and the blue dimension bits in an RGB color value may be interleaved to form a 24 bit integer. FIG. 12 discloses one example of how interleaving may be performed throughout this application.

In FIG. 12, the RGB color #15b01a may correspond to what is commonly known as "green." This green color, being a part of the RGB three dimensional color space, has three dimensions (red, green, and blue) that may respectively be represented in decimal (21, 176, 26), hex (15, b0, 1a) or bits (00010101, 10110000, 00011010). The bits of the red dimension 1302 may be ordered from highest to lowest, from left to right (e.g., big endian, smaller memory address to higher memory address). For example, the magnitude of a red light (e.g., LED "brightness") to display in combination with the other colors may be scaled according to the value of the red dimension. Each bit is valued according to its normally 8 bit/1byte integer weight. Thus, a "1" in the highest order bit is valued at 128 (2 to the 7th power (2^7)), whereas a 1 in the lowest order bit is valued as a 1 (2^0). For the example red dimension value 1302, the values are 00010101, which are values for the bits called R7, R6, R5, R4, R3, R2, R1, and R0, respectively.

Similarly, the magnitude of the green light to display in combination with the red and blue lights may be scaled according to the bits in green dimension 1304. For the example green dimension value 1304, the values are 10110000, which are values for the bits called G7, G6, G5, G4, G3, G2, G1, and G0 respectively. Likewise, the blue dimension values 00011010 are values for the bits B7, B6, B5, B4, B3, B2, B1, and B0 respectively.

A 24 bit integer value may then be formed that interleaves all of the bits of the red, green, and blue dimension values such that their order within a dimension is preserved. For example, 24 bit integer 1308 may now include, after being interleaved, 010000010111001100001100. This value corresponds to interleaving the bits in the following order: R7 G7 B7 R6 G6 B6 R5 G5 B5 R4 G4 B4 R3 G3 B3 R2 G2 B2 R1 G1 B1 R0 G0 B0. Other possible examples may include altering the order of the RGB bits (e.g., green first G7 B7 R7 G6 B6 R6 . . . etc.), reversing the order of the bits which may, for example, be used for little ending systems (R0 G0 B0 R1 G1 B1 R2 G2 B2 R3 G3 B3 R4 G4 B4 R5 G5 B5 R6 G6 B6 R7 G7 B7, or even B0 G0 R0 B1 G1 R1 B2 G2 R2 B3 G3 R3 B4 G4 R4 B5 G5 R5 B6 G6 R6 B7 G7 R7). One skilled in the art would understand how to implement a multi-dimensional color interleaving system using little endian ordering by using a reverse bit order. Additional alternative interleaved bit orderings may also be used that allow for 24 bit integer color range searching.

Returning to FIG. 11, at block 1208, for every RGB color converted to a 24 bit integer, the 24 bit one dimensional integer may then be stored in the color data store 1101 in association with the associated multidimensional color (such as in table 1105 in association with an RGB color), which may be indirectly or directly associated with an object in the color data store such as an item (e.g., an item identifier). In some embodiments, the 24 bit integer may be stored in direct association with an object in the color data store 1101 (e.g., a mapping to an item identifier in a single table).

At block 1212, the fast color data store generation process may determine whether all colors have been converted to a single 24 bit color 212. If not, arrow 1214 indicates that the process may repeat and more colors can be converted and stored in the color data store 1101. Otherwise, as indicated by arrow 1212, the process of converting all the colors may end.

At block 1216, the color data store 1101 may then index a column in a table storing the generated one-dimensional interleaved integer representing a color to enable fast range searching based on the one-dimensional integer. After indexing, the fast color data store generation process may end at block 1218. The color data store 1101 is now able to perform a fast color search when a query is received.

Figure 13:
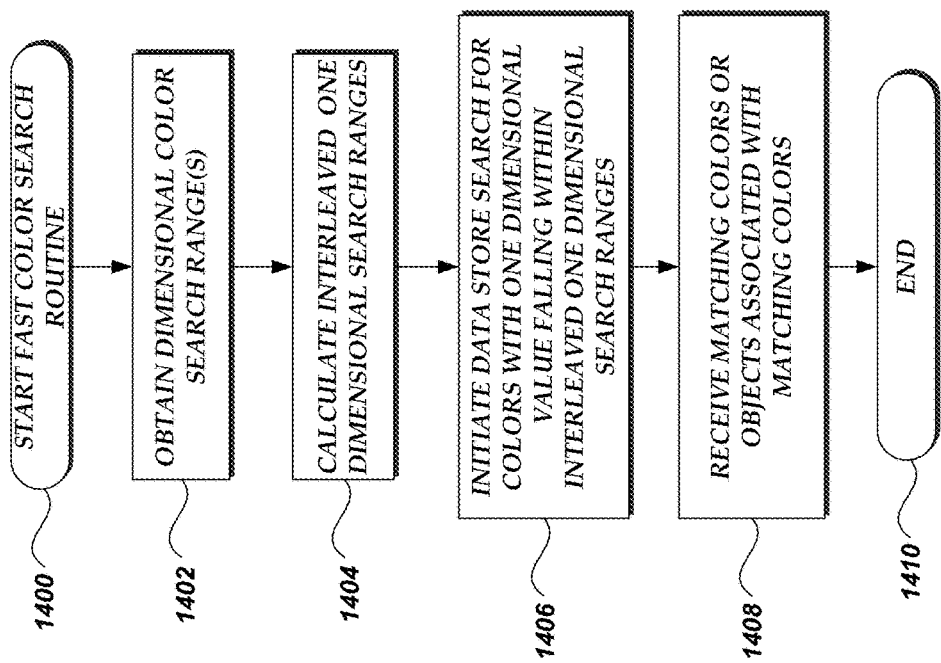
FIG. 13 is a flow diagram illustrating an example of a process for fast color searching.

FIG. 13 illustrates one embodiment of a routine executing on one or more computing devices, such as computing device 1107, for searching a fast color search data store such as color data store 1101. Such a routine may be performed by software instructions executed by a hardware processor and may include one or more components of the color search module 1109. The software instructions may be stored for execution in a non-transitory storage medium, such as one or more registers, memories, magnetic disks, flash memories, solid state drives, etc.

With further reference to FIG. 13, an embodiment of a fast color search routine 1400 implemented by an accessing computing device, such as the computing device 1107, will be described. One skilled in the relevant art will appreciate that actions/elements outlined for routine 1400 may be implemented by one or many computing devices/components/modules that are associated with the computing device 1107, such as the color search module 1109. Accordingly, routine 1400 has been logically associated as being performed by the computing device 1107.

At block 1402, the computing device 1107 obtains an input for a color range to search. In some embodiments, this input may include input from a man/machine interface, such as through a keyboard, mouse, etc., as input into a graphical user interface, such as a browser. For example, a user may browse a network site and input one or more RGB colors or color ranges to be searched. Such a color (e.g., an RGB value) may be selected via a color picker interface, a curated color palette, a color palette pulled from an image, an item that has one or more colors associated with it (e.g., to find other items with similar colors), a color determined from a keyword to color translation, or other method. In some embodiments, a color range to search may be obtained via the network, such as via a server receiving one or more packets from a client device containing color ranges to search. Various methods and systems used to obtain one or more colors or color ranges are described in U.S. patent application Ser. No. 14/316,292, entitled "BUILDING A PALETTE OF COLORS BASED ON HUMAN COLOR PREFERENCES," filed Jun. 26, 2014; U.S. patent application Ser. No. 14/316,442, entitled "BUILDING A PALETTE OF COLORS FROM A PLURALITY OF COLORS BASED ON HUMAN COLOR PREFERENCES," filed Jun. 26, 2014; U.S. patent application Ser. No. 14/315,913, entitled "DETERMINING AFFILIATED COLORS FROM KEYWORD SEARCHES OF COLOR PALETTES," filed Jun. 26, 2014; U.S. patent application Ser. No. 14/316,467, entitled "AUTOMATIC COLOR PALETTE BASED RECOMMENDATIONS FOR AFFILIATED COLORS," filed Jun. 26, 2014; U.S. patent application Ser. No. 14/316,268, entitled "AUTOMATIC IMAGE-BASED RECOMMENDATIONS USING A COLOR PALETTE," filed Jun. 26, 2014; and U.S. patent application Ser. No. 14/316,490, entitled "CREATION OF DATABASE OF SEARCHABLE COLOR NAMES," filed Jun. 26, 2014, each of which is incorporated by reference herein in its entirety.

If a color range is not obtained, but instead a single color is obtained, one or more color ranges to be searched may be determined based on one or more selected colors. In some embodiments, a color range may be determined based on a configurable color range that can be applied to a color. For example, if green color "#15b01a" is obtained, a color range may be determined by adding and subtracting from one or more color dimensions, a set value (for example, 4 color magnitude). Such an example would create a range of between (in hex) "11" to "19" in the red dimension, "ac" to "b4" in the green dimension, and "16" to "1e" in the blue dimension.

In another embodiment, the color range(s) may be determined by applying a human recognizable color distance/difference formula. Such a formula may generate one or more dimensional color ranges for a given RGB value that may be imperceptible to human detection based on a given starting color, and may be considered the same color as the starting color for human purposes. In an embodiment, the color search range may include those colors not detectable as different by a human, and/or may include those search ranges barely detectable as different by a human. Various methods and systems for determining a human perceptible color difference using a human color distance formula are described in U.S. patent application Ser. No. 14/316,483, entitled "IMAGE-BASED COLOR PALETTE GENERATION," filed Jun. 26, 2014; U.S. patent application Ser. No. 14/316,530, entitled "IMAGE-BASED COLOR PALETTE GENERATION," filed Jun. 26, 2014; U.S. patent application Ser. No. 14/316,528, entitled "IMAGE-BASED COLOR PALETTE GENERATION," filed Jun. 26, 2014; and U.S. patent application Ser. No. 14/316,549, entitled "IMAGE-BASED COLOR PALETTE GENERATION," filed Jun. 26, 2014, each of which is incorporated by reference herein in its entirety.

In yet another embodiment, the color range(s) may be determined based on the output of a previous item search through the use of a color adjustment user interface that allows for modification of a previously searched color. Unlike a color picker user interface that allows for the selection of a color, a color adjustment user interface may include a GUI slider that allows for searching, based on a given color or color range or a wider or narrower range of color; or allows the searched color or color range to be shifted to become more intense, darker, brighter, etc. The previous item search may be the result of a previous color search queried by color alone or in combination with other criteria (such as keywords, price, etc.). In such a scenario, a user interface may display all of the items such that the resulting items can be browsed and examined, and have the color adjustment user interface integrated therein. The user interface may be a network page that allows for scrolling through a plurality of search results. The network page may include a slider that allows for selection of tighter or broader color ranges.

For example, a user on computer device 107 may have selected the color green "#15b01a" from a network-based color picker user interface, and sent an item search to a network server along with the keyword "handbag." The computer device 107 may translate the green color into a color search range within a first threshold around the green color, for the query to include the color search range and the keyword "handbag," and transmitted the search criteria to color data store 1101. Once a response was received, the computing device 1107 may display all of the items and their associated images within a browser on a network page. The network page may have a slider user interface element that allows for the color search range to be adjusted upwards by sliding the interface in a first direction. Sliding in the first direction may direct computing device 1107 to resubmit the search with a wider or broader color search range than in the previous search. The color search range may be widened in a ratio consistent with an amount the slider was moved in the first direction.

Similarly, the previous color search range may be adjusted downward by a user sliding the slider in a second direction, which may cause the color search range to decrease in a ratio consistent with an amount the slider was moved in the second direction.

Once the slider or other adjustment user interface has been altered, the new search may be initiated based on the widened or narrowed color search range criteria. The search results in the response would thus be widened or narrowed in accordance with the new color search range. In this manner, a user can "see more" results matching a given color by widening a color search range, or "see less" results by narrowing the color search range.

In other embodiments, color(s) or color search range(s) may be obtained from other sources, including preexisting color palettes, opposite colors, opposite color palettes, color to keyword mappings, etc. Various methods and system for obtaining color(s) and color search range(s) are described in U.S. patent application Ser. No. 14/316,292, entitled "BUILDING A PALETTE OF COLORS BASED ON HUMAN COLOR PREFERENCES," filed Jun. 26, 2014; U.S. patent application Ser. No. 14/316,442, entitled "BUILDING A PALETTE OF COLORS FROM A PLURALITY OF COLORS BASED ON HUMAN COLOR PREFERENCES," filed Jun. 26, 2014; U.S. patent application Ser. No. 14/315,913, entitled "DETERMINING AFFILIATED COLORS FROM KEYWORD SEARCHES OF COLOR PALETTES," filed Jun. 26, 2014; U.S. patent application Ser. No. 14/316,467, entitled "AUTOMATIC COLOR PALETTE BASED RECOMMENDATIONS FOR AFFILIATED COLORS," filed Jun. 26, 2014; U.S. patent application Ser. No. 14/316,268, entitled "AUTOMATIC IMAGE-BASED RECOMMENDATIONS USING A COLOR PALETTE," filed Jun. 26, 2014; and U.S. patent application Ser. No. 14/316,490, entitled "CREATION OF DATABASE OF SEARCHABLE COLOR NAMES," filed Jun. 26, 2014, each of which is incorporated by reference herein in its entirety. Other parameters may also be specified as a part of a color search query to further filter desired results of the query. Such parameters may include keywords, item price, type of item/object, etc.

At block 1404, preprocessing may occur to form a fast color search query. For example, at block 1404, a process may generate, based on the obtained RGB color search ranges, one or more 24 bit integer search ranges to include in one or more color search queries. Further, at block 1404, one or more color search queries may be properly formulated. For example, once the 24 bit integer color search ranges have been generated, those ranges may be formed into one or more formatted SQL queries, API queries, web service queries, etc. Preprocessing is further described below with reference to FIG. 14.

At block 1406, computing device 1107 may initiate a search query. Initiating a search query may include transmitting a search query including the color range(s) to be searched over a network (e.g., local area network, Internet, VPN, etc.) by computing device 1107 to color data store 1101 or other color query enabled service such as a web service or color search server. In some embodiments, no transmission may be needed, as the color search module 1109 may have direct or local access to a color data store 1101, or may be able to execute the query itself via direct access to data store files (e.g., using SQLite).

At block 1408, once all 24 bit integer search ranges has been searched, the desired data store records that match or otherwise correlate to one or more of the searched ranges are received by the querying computing device, e.g., through a local process, or transmitted back to the computing device 1107 through the network and received by the computing device 1107. Such a search result may return one or more matching RGB colors, RGB color palettes, or even 24 bit integers that may be de-interleaved to determine an RGB color. In some embodiments, the search result may return objects (such as items) associated with the one or more 24 bit integer color search ranges that were requested in the query.

The search results may be compiled by the color data store 1101 or color search module 1109 by comparing the specified integer color search ranges in the query to the index of the 24 bit column. For example, an index may be a tree data structure where, by making integer comparisons to nodes in the tree, the tree may indicate one or more rows that match an integer search range. One advantage is that this is more efficient than a comparison of each row in the data store to the color range, or a comparison of each dimension's search range to three different indexes in a data store.

At block 1410, the color search routine may end, and the computing device 1107 may use the search results for further processing, or format and display the search results in a user application such as a browser.

Figure 14:
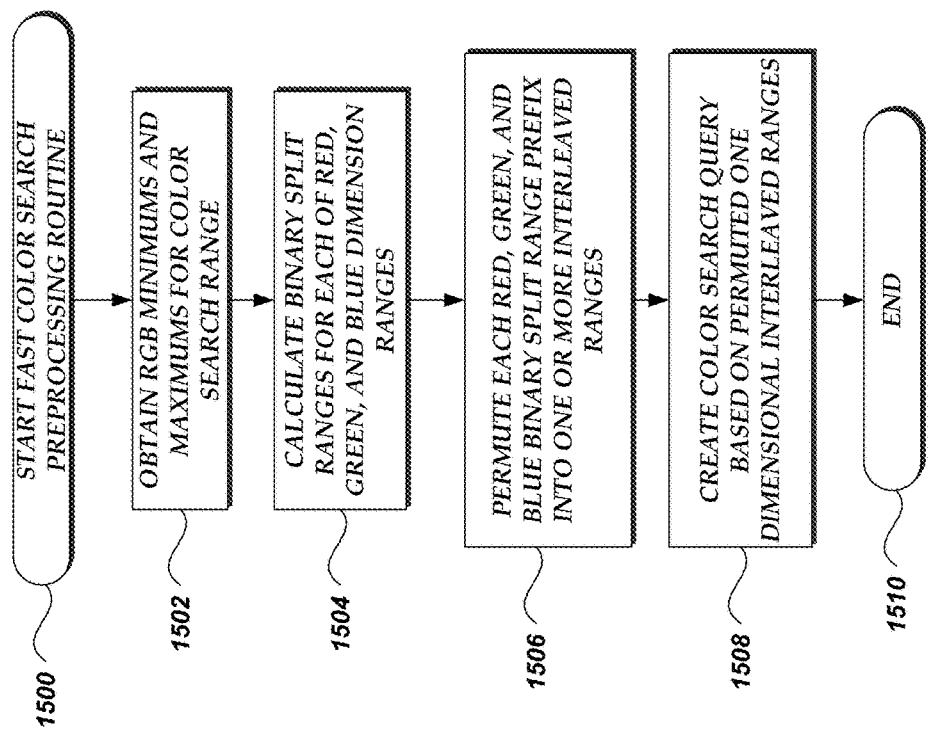
FIG. 14 is a flow diagram illustrating an example of a process for fast color search preprocessing.

With reference now to FIG. 14, an embodiment of a fast color search preprocessing routine 1500 implemented by an accessing computing device, such as the computing device 1107, will be described. One skilled in the relevant art will appreciate that actions/elements outlined for routine 1500 may be implemented by one or many computing devices/components/modules that are associated with the computing device 1107, such as the color search module 1109, or alternatively by color data store 1101 (e.g., when RGB color range(s) are specified in a transmitted search query by a user computing device, and a server or data store must translate the received RGB color range(s) into 24 bit integer color search ranges prior to searching). Accordingly, routine 1500 has been logically associated as being performed by the computing device 1107.

FIG. 14 illustrates one embodiment's preprocessing of an RGB color search range that may be performed by the color search module 1109. One skilled in the art will see that the preprocessing may be quickly extrapolated to any other multi-dimensional color arrangement other than RGB. For example, the computing device 1107 may have a color search module 1109 including JAVASCRIPT® instructions that may run in a browser. The JAVASCRIPT® instructions may preprocess one or more color search ranges prior to forwarding the ranges to a network server or data store server for searching. One of the advantages of using JAVASCRIPT® is that the processing load of an organization's data stores and servers may be reduced by having user operated computers perform preprocessing for a color search query instead. In addition to JAVASCRIPT®, one skilled in the art will recognize that other programming languages may also be used to implement the fast color searching techniques described herein, whether the resulting code is executed on the user computer side, the server(s) side, or in some combination thereof.

At block 1502, the computing device 1107 that is performing the preprocessing may obtain RGB color range values. The color range values may include a red maximum color value, a red minimum color value, a green minimum color value, a green maximum color value, a blue maximum color value, and a blue minimum color value. Embodiments may then translate these dimensional color ranges into one or more one dimensional 24 bit integer color search ranges that may be used in a fast color search query. An example process is described below with respect to blocks 1504, 1506, and 1508.

At block 1504, each dimensional color's range (e.g., minimum to maximum) may be further split, by the computing device 1107, into additional ranges across bit boundaries so that interleaved values may appropriately be searched in one dimension. These may be called binary split ranges or prefixes.

As an illustration of the problem to be solved is as follows. Assume the color search ranges of:
Red minimum: Hex-7e Binary-01111110
Red maximum: Hex-81 Binary-10000001
Green minimum: Hex-00 Binary-00000000
Green maximum: Hex-01 Binary-00000001
Blue minimum: Hex-fe Binary-11111110
Blue maximum: Hex-ff Binary-11111111

When interleaved, the result might appear to create the search range of, in binary: 001101101101101101101000 (interleaving all the minimum values) through 101001001001001001001111 (interleaving all the maximum values), which corresponds to the decimal integer range of 3,595,112 through 10,785,359. However, matching integer based colors within that range may not actually be within the color range to be searched. For example, 4,194, 304, which may correspond to the interleaved bit value 010000000000000000000000 and corresponds to the RGB color in hex of #008000 (i.e., a green value of #80), is not actually within the range to be searched (#7f00fe through #8101ff—green does not vary more than between 00 and 01), but does satisfy the criteria of being between 3,595,112 and 10,785,359. This error situation may occur because of bit carryovers from the interleaved values of the various colors. In other words, the carryovers in ranges in 24 bit integer interleaved form affect other dimensions' color values, which is an unintended consequence and makes some colors match a color search range in integer format when a color does not actually match the original color search range.

Such a situation may be avoided via preprocessing before a search query is executed. For example, the preprocessing for the above range will split integer search ranges where a carryover will affect a range to be searched. Instead of searching a single integer range from 3,595,112 through 10,785,359, two ranges can be searched instead: 001101101101101101101000 through 001101101101101101101111, and 101001001001001001001000 through 101001001001001001001111, corresponding to the ranges in decimal integer of 3,595,112 to U.S. Pat. No. 3,595,119, and 10,785,352 to Ser. No. 10/785,359, respectively. These split search ranges now appropriately capture the entire search range (e.g., the original search range #7f00fe through #8101ff is equivalent to ranges #7f00fe through #7f01ff and #810fe through #8101ff combined).

In some embodiments, postprocessing, rather than preprocessing, may be used to implement a fast-color search. In embodiments where data store records sparsely populate color search ranges, the identification of split integer search ranges may be performed on computing device 1107. Under this scenario, using the same example above, color data store 1101 may be searched by computing device 1107 using the larger range 3,595,112 through 10,785,359. Because records sparsely populate that range in color data store 1101, a limited number of query results may be returned. Because only a limited number of search results are expected to be returned, computing device 1107 may determine each split search range after issuing its query to the data store (instead of before), and analyze each individual query result to determine whether it falls within any of the determined split search ranges. One of the advantages of this type of embodiment is that it moves processing from color data store 1101 (e.g., comparison of each smaller split search range) to computing device 1107, thus reducing the overall load on color data store 1101. This type of implementation may also be used in combination with a color data store 1101 made up of multiple sub-data stores because under that scenario the sparseness of each sub-data store can be controlled to make post-processing an optimal strategy.

Thus, at block 1504, binary split ranges may be determined for each RGB color dimension by determining high order bit prefixes that can be filled out with the remaining bits as 0s or 1s to determine a split search range. Binary split ranges can be determined by calculating one or more range prefixes for the minimum and maximum values of a color dimension, and combining these range prefixes into a list of range prefixes for a given dimension.

For example, for the red color search range, one prefix (the base prefix) may be identified by determining the highest order bit of the minimum value that has the value of "1" as a minimum, and then using the minimum as a lower bound with the upper bound being all previous 0s. If the red color search range was from 00001010 (minimum red value) through 00010000 (maximum red value), then aforementioned prefix may correspond to the bit prefix of 0000101 of the minimum value. This prefix may be thought of as a range (e.g., binary split range) which corresponds to a range of 00001010 through 00001011 (i.e., a range based on the prefix where the remaining bits (underlined) are all filled out with 0s for the minimum of the range, and is for the maximum of the range). Thus, the prefix value 0000101 may be added to a list of prefixes for the red color.

More prefixes may be identified by computing device 1107 based on the minimum value. One criterion for identifying additional prefixes involves examining the base prefix. Starting from the lowest bit, if there are any additional higher order bits in the base prefix that have a 0 (e.g., 0000101), an additional prefix may be identified if the additional prefix includes lower order bits than the highest order bit of the minimum value bit that equals 0, and the maximum bit of that order is a 1. This bit may be referred to as a "divergent" bit, since it is the bit where the maximum value begins to diverge from the minimum value). Such a prefix may then be finally identified by replacing the identified "0" with a "1." More than one additional prefix may exist within the base prefix.

Returning to our example, the minimum value has such a matching zero, 00001010, and the prefix includes 000010, which includes lower order bits than divergent bit (here underlined where the bit strings diverge: min: 00001010 and max: 00010000). The identified prefix contains bits of a lower order than the divergent bit (e.g., the fifth and sixth lowest order bits). Since 000010 has been identified, the actual prefix to add is 000011 (" . . . the prefixes may then be included by replacing the identified '0' with a '1'"). Thus, this would identify the additional prefix of "000011" and add it to the list of prefixes for the red color (which already contained 0000101).

Another set of prefixes may be determined by computing device 1107 by analyzing the maximum bit value for a color. The computing device 1107 may identify the lowest order bit value of the maximum value that is a 0, and taking as a prefix the identified value 0 bit, and all higher order bits. Thus, 00010000 would be added as a prefix to the growing list.

Another set of prefixes that may be added are any prefixes of the maximum value where the maximum value has a bit of "1" after the divergent bit. These prefixes may then be included by replacing the identified "1" with a "0."

In the afore-mentioned example, no additional prefixes would be identified, as the maximum red value is 00010000, and has no bits with a "1" value after the divergent bit. However, if the maximum red value was actually 00010100, then the second "1" would identify a prefix, 000101, the second "1" would then be replaced with a "0" (to form prefix 000100), and the prefix 000100 would be added to the list of red prefixes.

Although the example above determined a list of binary split ranges (e.g., a prefix list) for red values, a list of binary split ranges may be determined for the blue and green dimensions similarly, or any dimension of a color space. Thus, a list of binary split ranges/prefixes may be determined for each color dimension, and specifically for the red, green, and blue dimensions based on the maximum and minimum values in a range to be searched for each dimension.

Returning to FIG. 14, at block 1506, the prefixes may be permuted and interleaved by computing device 1107. Each such permutation may be converted into one or more 24 bit integer ranges for searching (or other n-dimensional interleaved bit integer range depending on how many bits makeup a dimension, and how many dimensions make up the color model).

For example, using RGB, there may be three prefix lists one for red, one for green and one for blue. Each prefix in the red list may be permuted with all of the other prefixes for the other colors, so that the computer determines all possible combinations of prefixes that have one prefix from the red list, one prefix from the green list, and one prefix from the blue list. Each permutation can be interleaved and converted into one or more 24 bit integer search ranges.

Figure 15:
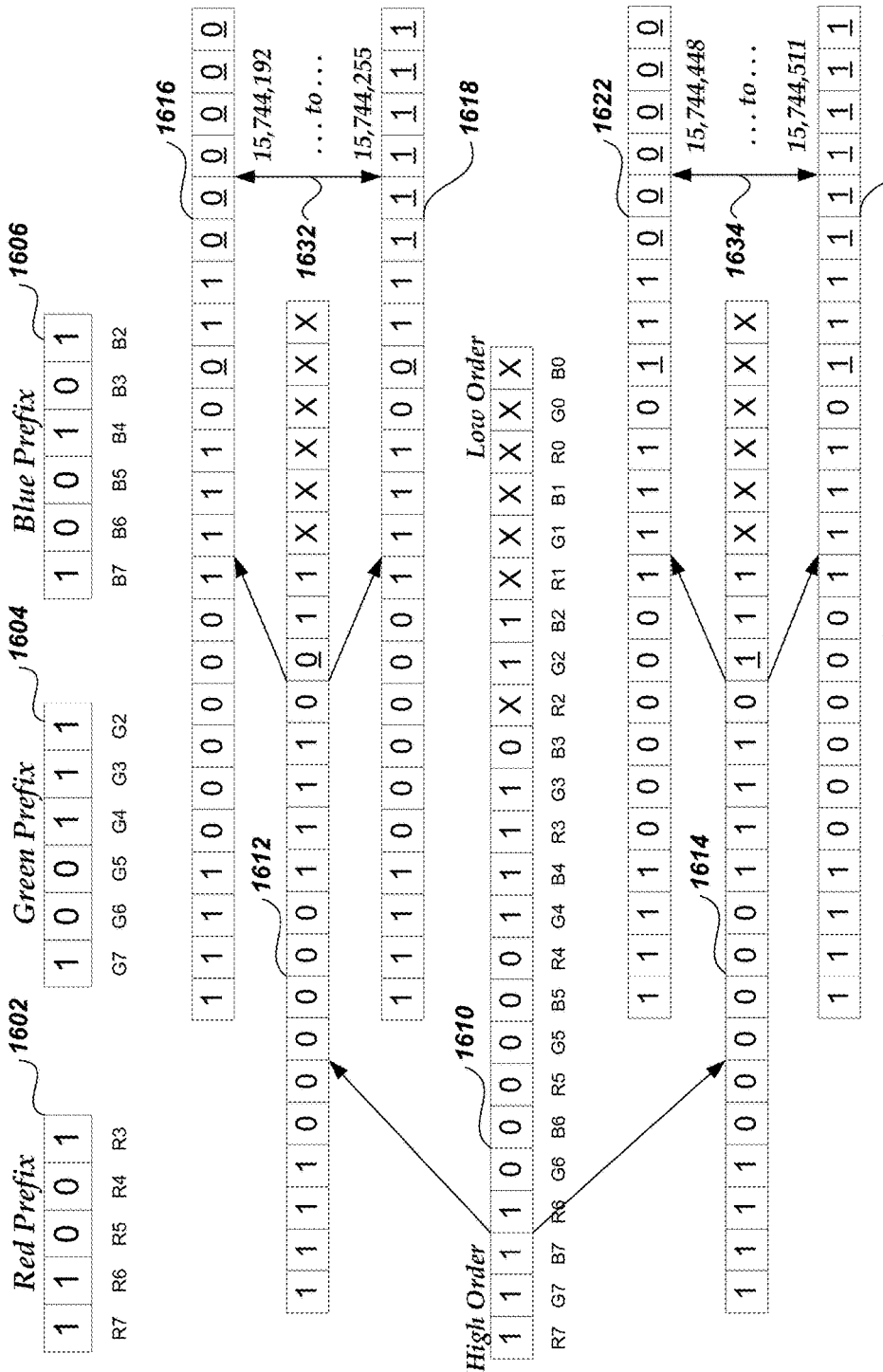
FIG. 15 is a schematic diagram illustrating an example of interleaved one dimensional color ranges computed from a permutation of range prefixes.

FIG. 15 illustrates an example of interleaving and conversion of a particular permutation by computing device 1107. For this example permutation, a red prefix 1602 has been selected (11001), a green prefix 1604 has been selected (100111), and a blue prefix 1606 has been selected (100101). These bits may then be interleaved based on their bit order, such as described in FIG. 12. However, a number of bits are not present in the prefixes. For example, the red prefix is missing the last three bits, and the blue and green prefixes are missing the last two bits. This creates an interleaved bit structure that would be incomplete. For example, interleaved bits 1610 shows an interleaved string with missing bits (Xs) based on these prefixes, and thus showing that the R2 bit is missing, and the R1, G1, B1, R0, G0, and B0 bits are also missing.

There may be two types of missing bits. The first type may be a missing bit that has lower order bits in the 24 bit integer that are defined. This may be called an "interior split bit." For example, the bit labeled R2 in interleaved bits 1610 is missing, as indicated by the "X." However, the bits G2 and B2, are defined (e.g., were included in the selected green prefix 1604 and blue prefix 1606) and are of a lower order in the 24 bit string ("lower order" here, for this 24 bit interleaved integer, means "comes after" or of a lower order when the 24 bit interleaved integer is considered a normal integer).

When a bit of the first type is identified, the permutation of red, green, and blue prefixes may be split into two identical permutations for further range determination, where a first permutation 1612 has a "0" for the identified bit, and a second permutation 1614 has a "1" for the identified bit (as indicated by the underlined bit values in interleaved 24 bit integers 1612 and 1614). Further missing bit analysis may then be performed on these two similar permutations of the prefixes with only one bit of difference. The original permutation, here permutation 1610, need not be further analyzed. This type of split may be performed again and again until there are no more interior split bits within any of the resulting permutations.

A second type of missing bit may also be identified. This missing bit may be identified by determining that the missing bit does not have any defined bits of a lower order. For reference, this missing bit may be called an "ending range bit." When this type of bit is identified, and usually after all interior split bits have been resolved through a split into two identical permutations with only a one bit difference, then a permutation may be converted to a 24 bit range. This is done by calculating two 24 bit integers: a lower bound of the range which is determined by taking the permutation and setting all remaining ending range bits to "0," and another upper bound of the range which is determined by taking the permutation and setting all remaining ending range bits to "1."

For example, interleaved 24 bit permutations 1612 and 1614 have remaining ending range bits, corresponding to R1, G1, B1, R0, G0, and B0 (in other words, the last 6 bits of the interleaved 24 bit integer). Because there are no defined bits of lower order than the ending range bits, these bits may now be used to form an integer search range. For permutation 1612, the lower bound may be determined by setting the ending range bits to 0 (as shown in permutation 616), which equals the integer 15,744,192. The upper bound may be determined by setting the ending range bits to 1 (as shown in permutation 1618), which equals the integer 15,744,255. Thus, one calculated search range 1632 may be a query range for an interleaved color value between 15,744, 192 and 15,744,255.

For permutation 1614, the lower bound may be determined by setting the ending range bits to 0 (as shown in permutation 1622), which equals the integer 15,744,448. The upper bound may be determined by setting the ending range bits to 1 (as shown in permutation 1620), which equals the integer 15,744,511. Thus, one calculated search range 634 may be a query range for an interleaved color value between 15,744,448 and 15,744,511. All of the identified 24 bit color search ranges, over all of the permutations of prefixes, may be collected and stored to be searched.

Returning to FIG. 14, after determining one or more permuted one dimensional interleaved color search ranges as described above, one or more color search queries may be formed at block 1508. One example embodiment may generate an SQL "where" clause to string together multiple 24 bit integer color search ranges in a query (e.g., an SQL "select" statement). For example, a clause such as "SELECT * FROM <table 1105>WHERE (interleave_rgb_color BETWEEN 15744448 AND 15744511) OR (interleave_rgb_color BETWEEN 15744192 AND 15744255)," where the query lists all search ranges, may be one such crafted query based on the examples above. However, the query would likely be much longer if there are further permutations of red, green, and blue prefixes that may be combined to form unique search ranges, each of which may produce one or more search ranges depending on the number of interior split bits. All of the resulting ranges may be used to form a query, or multiple queries, for total range coverage of a traditional multi-dimensional color search query. In other embodiments, a properly formatted web service query may incorporate the determined integer color ranges to search by adding the ranges as parameters to a search.

After the search query(ies) are generated, at block 1510, the preprocessing routine may end. The search may now be transmitted or executed, as described with reference to FIG. 13 (e.g., block 1406).

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal. A software module can comprise computer-executable instructions which cause a hardware processor to execute the computer-executable instructions. The computer-executable instructions can comprise a scripted computer language and/or a compiled computer language. Computer-executable instructions can comprise, for example and without limitation, JAVASCRIPT®, PYTHON™, php, SQL, C, C++, JAVA®, C#, Fortran, BASIC, shell scripts, Perl, or the like.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
a data store configured to store at least a plurality of color palettes and a plurality of images, wherein each color palette of the plurality of color palettes comprises a name and a plurality of colors, and wherein each color palette of the plurality of color palettes is associated with a rating; and
a hardware processor in communication with the data store, the hardware processor configured to execute computer-executable instructions to at least:
receive a keyword;
select, from the plurality of color palettes, a first color palette associated with the keyword based at least in part on the name of the first color palette, the plurality of color palettes further comprising a second color palette associated with a first rating and a third color palette associated with a second rating;
identify an affiliated color palette based at least in part on a first affiliated color of the affiliated color palette matching a first color from the first color palette;
determine a color threshold from the first color of the first color palette in a color space, wherein the color space corresponds to a mathematical color model, and wherein the first color within the mathematical color model corresponds to a coordinate;
generate a plurality of affiliated colors from at least the affiliated color palette, wherein generating the plurality of affiliated colors comprises:
for each affiliated color of at least the affiliated color palette,
identifying a respective affiliated color that is above the color threshold from the first color in the color space; and
selecting the respective affiliated color as part of the plurality of affiliated colors;
select, from the plurality of affiliated colors, a subset of affiliated colors, wherein selecting the subset of affiliated colors comprises:
determining the second color palette comprises a second affiliated color of the plurality of affiliated colors and the third color palette comprises a third affiliated color of the plurality of affiliated colors; and
selecting the second affiliated color instead of the third affiliated color based at least in part on the first rating having a higher rank than the second rating, wherein the subset of affiliated colors comprises the second affiliated color, and wherein the subset of affiliated colors excludes the third affiliated color;
identify a subset of the plurality of images matching a color of the subset of affiliated colors, wherein identifying the subset of the plurality of images further comprises:
calculating an integer search range, wherein calculating the integer search range further comprises interleaving bits from a color range from a first color of the subset of affiliated colors;
initiating a search of a second data store based at least in part on a search query comprising the integer search range as a search parameter, the second data store comprising a record associated with at least one indexed integer color value;
receiving a search result from the second data store, the search result comprising a first record associated with a first indexed integer color value for the first color, the first record further associated with a first image; and
adding the first image to the subset of the plurality of images; and
cause presentation, in a user interface, of the subset of the plurality of images.

2. The system of claim 1, wherein the hardware processor is further configured to execute computer-executable instructions to at least determine one or more color names for at least one color of the plurality of affiliated colors.

3. The system of claim 1, wherein the hardware processor is further configured to execute computer-executable instructions to at least:
determine an item associated with an image of the subset of the plurality of images; and
determine metadata associated with the item.

4. The system of claim 1, wherein the keyword is based at least in part on user input.

5. The system of claim 1, wherein the keyword is based at least in part on automated input of at least one of trending search history, trending geo-location data or data associated with an upcoming event.

6. The system of claim 1, wherein identifying the affiliated color palette based at least in part on the first affiliated color matching the first color further comprises:
determining that the first affiliated color is within the color threshold from the first color in the color space.

7. A computer-implemented method comprising:
under control of a hardware computing device configured with specific computer-executable instructions,
receiving a search phrase;
selecting, from a plurality of color palettes, a first color palette associated with at least a portion of the search phrase, wherein each color palette of the plurality of color palettes is associated with a rating, and wherein the plurality of color palettes further comprise a second color palette associated with a first rating and a third color palette associated with a second rating;
identifying an affiliated color palette based at least in part on a first affiliated color of the affiliated color palette matching a first color from the first color palette;
determining a color threshold from the first color of the first color palette in a color space, wherein the color space corresponds to a mathematical color model, and wherein the first color within the mathematical color model corresponds to a coordinate;
generating a plurality of affiliated colors from at least the affiliated color palette, wherein generating the plurality of affiliated colors comprises:
for each affiliated color of at least the affiliated color palette,
identifying a respective affiliated color that is above the color threshold from the first color in the color space; and
selecting the respective affiliated color as part of the plurality of affiliated colors;

selecting, from the plurality of affiliated colors, a subset of affiliated colors, wherein the second color palette comprises a second affiliated color of the plurality of affiliated colors and the third color palette comprises a third affiliated color of the plurality of affiliated colors, and wherein selecting the subset of affiliated colors comprises:
    selecting the second affiliated color instead of the third affiliated color based at least in part on the first rating having a higher rank than the second rating, wherein the subset of affiliated colors comprises the second affiliated color, and wherein the subset of affiliated colors excludes the third affiliated color;
identifying, from a plurality of images, a subset of the plurality of images matching a color of the subset of affiliated colors, wherein identifying the subset of the plurality of images further comprises:
    calculating an integer search range, wherein calculating the integer search range further comprises interleaving bits from a color range from a first color of the subset of affiliated colors;
    initiating a search of a data store based at least in part on a search query comprising the integer search range as a search parameter, the data store comprising a record associated with at least one indexed integer color value;
    receiving a search result from the data store, the search result comprising a first record associated with a first indexed integer color value for the first color, the first record further associated with a first image; and
    adding the first image to the subset of the plurality of images; and
causing presentation, in a user interface, of the subset of the plurality of images.

8. The computer-implemented method of claim 7, further comprising determining one or more color names for at least one color of the plurality of affiliated colors.

9. The computer-implemented method of claim 7, further comprising determining an item associated with an image of the subset of the plurality of images.

10. The computer-implemented method of claim 9, further comprising determining metadata associated with the item.

11. The computer-implemented method of claim 7, wherein the search phrase is based at least in part on user input.

12. The computer-implemented method of claim 7, wherein the search phrase is based at least in part on automated input of trending geo-location data.

13. The computer-implemented method of claim 7, wherein identifying the affiliated color palette based at least in part on the first affiliated color matching the first color further comprises:
    determining that the first affiliated color is within the color threshold from the first color in the color space.

14. The computer-implemented method of claim 7, wherein at least some of the plurality of images are retrieved from an image data store.

15. A non-transitory computer-readable storage medium storing computer executable instructions that when executed by a processor perform operations comprising:
    receiving a search phrase;
    selecting, from a plurality of color palettes, a first color palette associated with at least a portion of the search phrase, wherein each color palette of the plurality of color palettes is associated with a rating, and wherein the plurality of color palettes further comprise a second color palette associated with a first rating and a third color palette associated with a second rating;
    identifying an affiliated color palette based at least in part on a first affiliated color of the affiliated color palette matching a first color from the first color palette;
    determining a color threshold from the first color of the first color palette in a color space, wherein the color space corresponds to a mathematical color model, and wherein the first color within the mathematical color model corresponds to a coordinate;
    generating a plurality of affiliated colors from at least the affiliated color palette, wherein generating the plurality of affiliated colors comprises:
        for each affiliated color of at least the affiliated color palette,
        identifying a respective affiliated color that is above the color threshold from the first color in the color space; and
        selecting the respective affiliated color as part of the plurality of affiliated colors;
    selecting, from the plurality of affiliated colors, a subset of affiliated colors, wherein the second color palette comprises a second affiliated color of the plurality of affiliated colors and the third color palette comprises a third affiliated color of the plurality of affiliated colors, and wherein selecting the subset of affiliated colors comprises:
        selecting the second affiliated color instead of the third affiliated color based at least in part on the first rating having a higher rank than the second rating, wherein the subset of affiliated colors comprises the second affiliated color, and wherein the subset of affiliated colors excludes the third affiliated color;
    identifying, from a plurality of images, a subset of the plurality of images matching a color of the subset of affiliated colors, wherein identifying the subset of the plurality of images further comprises:
        calculating an integer search range, wherein calculating the integer search range further comprises interleaving bits from a color range from a first color of the subset of affiliated colors;
        initiating a search of a data store based at least in part on a search query comprising the integer search range as a search parameter, the data store comprising a record associated with at least one indexed integer color value;
        receiving a search result from the data store, the search result comprising a first record associated with a first indexed integer color value for the first color, the first record further associated with a first image; and
        adding the first image to the subset of the plurality of images; and
    causing presentation, in a user interface, of the subset of the plurality of images.

16. The non-transitory computer-readable storage medium of claim 15, the operations further comprising determining one or more color names for at least one color of the plurality of affiliated colors.

17. The non-transitory computer-readable storage medium of claim 15, the operations further comprising determining an item associated with an image of the subset of the plurality of images.

18. The non-transitory computer-readable storage medium of claim 15, wherein the search phrase is based at least in part on automated input.

19. The non-transitory computer-readable storage medium of claim 15, wherein identifying the affiliated color palette based at least in part on the first affiliated color matching the first color further comprises:
   determining that the first affiliated color is within the color threshold from the first color in the color space.

20. The non-transitory computer-readable storage medium of claim 15, wherein at least some of the plurality of images are retrieved from an image data store.

\* \* \* \* \*